United States Patent
Linder

(10) Patent No.: US 9,953,523 B2
(45) Date of Patent: Apr. 24, 2018

(54) NODE-CENTRIC NAVIGATION OPTIMIZATION

(71) Applicant: HERE Global B.V., Veldhoven (NL)

(72) Inventor: Eric Linder, Downers Grove, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/135,863

(22) Filed: Apr. 22, 2016

(65) Prior Publication Data

US 2017/0309172 A1    Oct. 26, 2017

(51) Int. Cl.
| | |
|---|---|
| G08G 1/00 | (2006.01) |
| G08G 1/01 | (2006.01) |
| G01C 21/34 | (2006.01) |
| G08G 1/0968 | (2006.01) |
| H04W 24/08 | (2009.01) |
| H04W 8/18 | (2009.01) |

(52) U.S. Cl.
CPC ........... *G08G 1/0133* (2013.01); *G01C 21/34* (2013.01); *G01C 21/3415* (2013.01); *G08G 1/0116* (2013.01); *G08G 1/0145* (2013.01); *G08G 1/096833* (2013.01); *H04W 8/183* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 6,012,012 A | 1/2000 | Fleck et al. | |
| 6,587,785 B2 * | 7/2003 | Jijina | G01C 21/3415 701/117 |
| 7,778,773 B2 | 8/2010 | Yaqub et al. | |
| 8,892,344 B2 | 11/2014 | Alpert et al. | |
| 2002/0161519 A1 * | 10/2002 | Mori | G01C 21/3407 701/410 |
| 2010/0191455 A1 | 7/2010 | Sugawara | |
| 2012/0256770 A1 | 10/2012 | Mitchell | |
| 2014/0046585 A1 | 2/2014 | Morris, IV et al. | |
| 2015/0046085 A1 | 2/2015 | Gomisiewicz | |
| 2015/0253144 A1 | 9/2015 | Rau et al. | |
| 2015/0319093 A1 | 11/2015 | Stolfus, II | |
| 2015/0369617 A1 * | 12/2015 | Ding | G01C 21/34 701/428 |
| 2016/0349063 A1 * | 12/2016 | Maurer | G01C 21/34 |

FOREIGN PATENT DOCUMENTS

WO    WO2015134476    9/2015

OTHER PUBLICATIONS

Search Report dated Feb. 15, 2018, European Search Report cited in the European Patent Application No. EP17167338.7; dated Feb. 15, 2018; 9 pages.

* cited by examiner

*Primary Examiner* — Redhwan K Mawari
*Assistant Examiner* — Edward Torchinsky
(74) *Attorney, Agent, or Firm* — Lempia Summerfield Katz LLC

(57) ABSTRACT

Vehicle position data from vehicles on a roadway are received. Affected nodes of the roadway are identified based on the vehicle position data. The roadway graph, representative of the roadway, is updated based on the affected nodes of the roadway. Routes of each vehicle are optimized based on updates to the roadway graph. An indication of change in the route of each vehicle may be provided for display.

17 Claims, 15 Drawing Sheets

NODE-CENTRIC NAVIGATION OPTIMIZATION

FIELD

The following disclosure relates to navigation optimization, and more particularly, to the optimization of vehicle navigation routes based on assessment of traffic conditions at road connection points.

BACKGROUND

Traffic congestion may be determined by monitoring data from a combination of traffic data sources such as traffic channels, radio, and personal navigation devices. Thus, traffic information is reported to multiple data stores based on the monitoring data types. Traffic information provided to routing algorithms from these congestion identification sources come from secondary devices where the determination of traffic frequently requires analysis of source data to determine if traffic congestion is present. The aggregation of traffic data from multiple sources limits the speed of updating the congestion information based on changing traffic conditions.

Traffic reports may provide a high level view of traffic conditions. For example, providing traffic at the level of a traffic message channel (TMC) code provides a generalized traffic condition based on accumulated traffic information over multiple road sections. This form of congestion monitoring relies on ranges and averages of passing vehicles and may not report the number and wait times of vehicles in the same direction that are approaching a particular stop light in the same city. Further, fleets or groups of vehicle are not treated in groups. While some routing algorithms may take into account traffic congestion information, such information is provided from traffic broadcast that cannot take into account information from other drivers obtained from a centralized traffic map.

Currently available data probe information from Global Positioning System (GPS) devices provide data point information suffering from multipath and other problems in urban areas. These problems cause errors associated with traffic congestion analysis using GPS points. Automated vehicles determine general location using a variety of data including GPS sensors, Light Detection And Ranging (LiDAR), visual street signs, and other information. Thus, an automated vehicle may be capable of better awareness of location than location determinations made from GPS points along, and thus may be capable of more accurate and precise traffic and congestion analysis. Accordingly, the use of only GPS location information in combination with traffic congestion reporting is limited in reporting vehicle location and traffic congestion with respect to accuracy and precision.

SUMMARY

In one embodiment, a method of node-centric navigation optimization is provided. Vehicle position data is received from a vehicle on a roadway, and an effective node of the roadway is identified based on the vehicle position data. A roadway graph representative of at least a portion of the roadway is updated based on the affected node of the roadway. A route of the vehicle is optimized based on the updated roadway graph. The method further includes providing an indication of changes in the route for display to a passenger of the vehicle on the roadway.

In another embodiment, an apparatus for node-centric navigation is provided comprising at least one processor and at least one memory including computer program code for one or more programs. The at least one memory and the computer program code configured to, with the at least one processor, cause the apparatus to receive vehicle position data associated with the vehicle on a roadway, and identify an affected node of the roadway based on the vehicle position data. The computer program code and processor may further cause the apparatus to update the roadway graph representative of at least a portion of the roadway based on the affected node of the roadway, and optimize the route of the vehicle based on the updated roadway graph. The computer program code and process may further cause the apparatus to, provide an indication of changes in the route to a passenger of the vehicle on the roadway.

In another embodiment, an apparatus for node-centric navigation is provided comprising at least one processor and at least one memory including computer program code for one or more programs. The at least one memory and the computer program code configured to, with the at least one processor, cause the apparatus to receive vehicle position data, and identify an affected node of the roadway based on the vehicle position data. The computer program code and processor may further cause the apparatus to update the roadway graph representative of at least a portion of the roadway based on the affected node of the roadway, and provide the updated roadway graph to the vehicle on the roadway for optimization of a route of the vehicle.

In yet another embodiment, a method of node-centric navigation optimization includes receiving vehicle position data based on a group of associated vehicles on roadways of a geographic area. The method identifies one or more affected nodes of roadways based on vehicle position data of the group of vehicles. The method further includes updating a roadway graph representative of roadways of the geographic area based on affected nodes of the roadway, and optimizes routes of the group of associated vehicles based on the updated roadway graph. The method also provides an indication of changes in the routes to vehicles in the group.

BRIEF DESCRIPTION OF THE DRAWINGS

Exemplary embodiments of the disclosure are described herein with reference to the following drawings.

DETAILED DESCRIPTION

Figure 1:
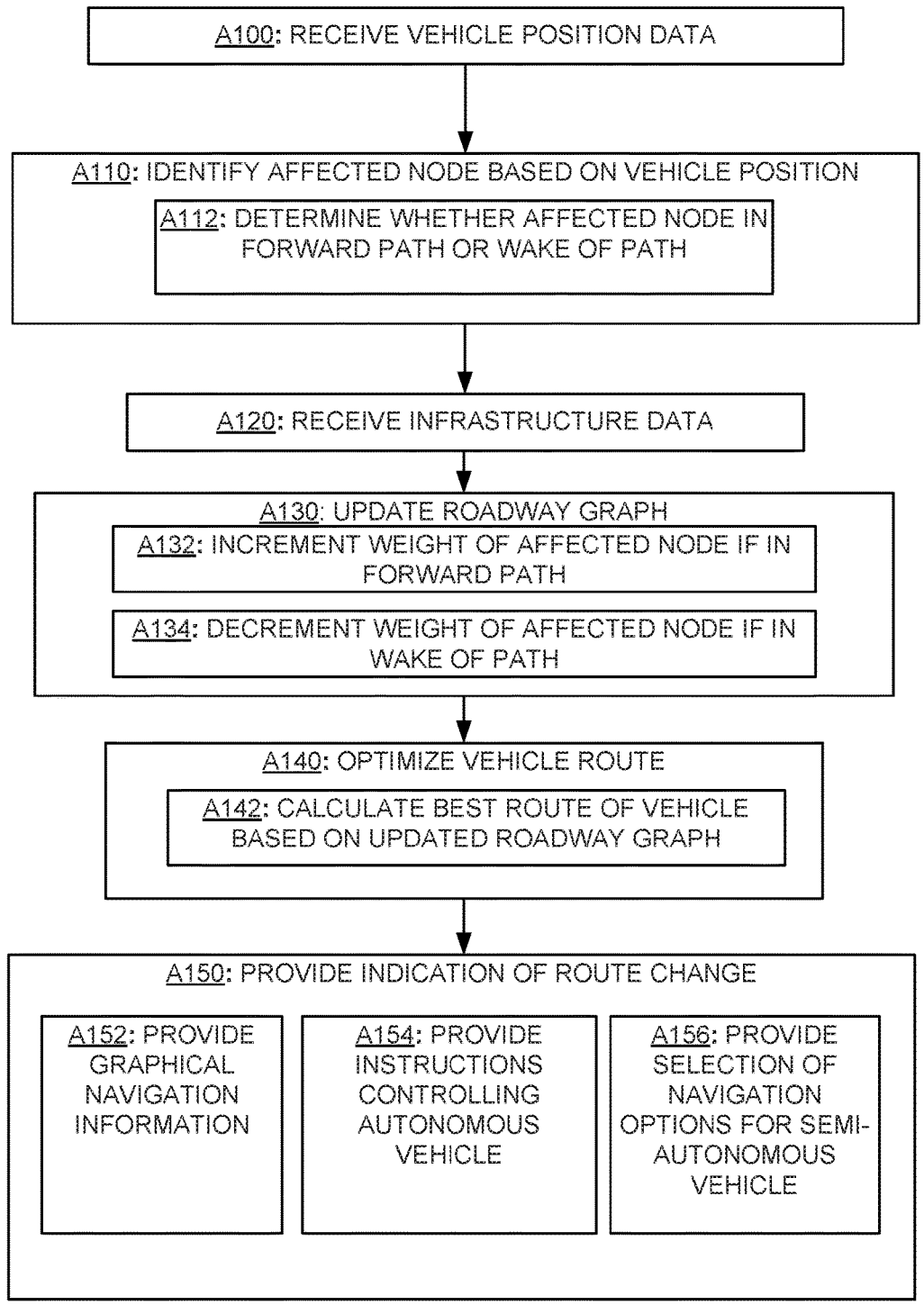
FIG. 1 is a flow diagram in accordance with the subject technology for node-centric navigation optimization.

Traffic congestion monitoring and reporting suffers from the drawback of slow reporting, overly generalized congestion determinations, and cannot be made specific to a fleet of vehicles. A goal of the following embodiments is to provide a real-time, highly detailed evaluation of roadway conditions specific to individual intersections. Intersections of a traffic cluster may be represented as a node. In order to identify the traffic at each node, a roadway graph may be established describing the current state of each node with respect to adjacent nodes. The roadway graph may be shared amongst a fleet of vehicles, all vehicles within a geographic area, or one or more selected vehicles within a geographic area. Each vehicle within the group provides vehicle position information as the vehicle travels through the geographic area. The vehicle position information describes the current state of each node. Updates to the roadway graph may be determined substantially in real time while the vehicles move from node to node reporting their positions.

Continuously updated or traffic reporting in real time, or substantially real time, is desirable to provide route optimization for vehicles currently travelling along a route. Real time and substantially real time means instantaneous or with a humanly imperceptible delay. Transmission and processing delays resulting from using multiple sources of data are reduced in the disclosed embodiments by determining congestion information using a single source and/or storing congestion information using a centralized, cloud-based data store. A goal of the subject disclosure for node centric navigation optimization provides a granular level view of roadway conditions at the intersection level. A granular view provides a more holistic view of an area than how traffic is otherwise reported. The following embodiments emphasize the importance of the whole and interdependence of its parts to achieve the goal of better fleet performance. The following embodiments provide a granular quantification of traffic volume and congestion, resolving limitations of cloud-based traffic analysis and broadcast of traffic congestion data.

Traffic congestion is classified within three or four ranges, depicted on a map using color coding on roadways to show traffic congestion. For example, black, red, yellow, and green levels may provide range indicators of decreasing levels of traffic congestion. However, these levels but cannot convey enough information to optimize a vehicle route within individual segments of roadway having the same traffic congestion level. Thus, navigation cannot be optimized at the intersection level of the roadway. The following embodiments provide rerouting and/or changes in navigation directions based on changes in traffic between road segments by determining the congestion at each intersection based on the number of vehicles at and/or approaching each intersection.

Congestion determinations based on average speeds of vehicles along a north to south road fail to provide enough information to allow for optimization of route selection of an east to west road crossing the north to south road. That is, navigation systems cannot select the best intersection at which to cross the north to south road. A navigation system using averaged speeds to determine congestion ranks each of link as equal. Accordingly, the congestion at each node cannot be determined. Within a high congestion area, determination of roadway conditions at each node, as provided herein, allows navigation systems and routing algorithms to optimize navigation with a higher degree of specificity (e.g., within the high congestion area) to achieve the best or fastest possible travel times within the area. The disclosed embodiments advantageously provide continuously updated roadway information resulting in reduced trip time, minimized travel distance, or other desire optimization.

The term "vehicle" as used herein encompasses its plain and ordinary meaning including, but not limited to a car, bus, train, plane, boat, bicycle, tramway, or pedestrian locomotion. The term "vehicle" includes any motorized or unmotorized form of transportation and/or locomotion. The navigation optimization system may be used in tandem with an autonomous or semi-autonomous vehicle. A driver or passenger in a vehicle may use the navigation optimization system. "Passenger" may refer to any one or more passengers of the vehicle including the driver. Use of the navigation optimization system may be particularly applicable to applications associated with semi-autonomous or autonomous vehicles.

The term "autonomous" as used herein may refer to a self-driving or driverless mode that no passengers are required to be on board to operate the vehicle. An autonomous driving vehicle may be referred to as a robot vehicle or an autonomous driving vehicle. The autonomous driving vehicle may include passengers, but no driver is necessary. Autonomous driving vehicles may park themselves or move cargo between locations without a human operator. Autonomous driving vehicles may include multiple modes and transition between the modes.

As described herein, a semi-autonomous or highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode that the human operator exercises a degree of control over the movement of the vehicle. The vehicles may also include a completely driverless mode. Other levels of automation are possible.

The capabilities of the subject technology for node-centric navigation optimization are applicable to autonomous driving vehicles, semi-autonomous vehicles, and provide a navigation aid to user operated vehicles. Route optimization using the subject technology can assist in providing route optimization prioritizing a route based on comparative roadway conditions at the intersection level. The subject technology for node-centric navigation optimization may additionally aid in autonomous vehicle navigation.

FIG. 1 is a flow diagram in accordance with the subject technology for node-centric navigation optimization. Acts are described with reference to the system and components depicted in FIGS. 5-7. Additional, different, or fewer acts may be provided. Acts may be performed in orders other than those presented herein.

In act A100, vehicle position data is received. The vehicle position data may be received by server 125 from a vehicle 129 traveling on a roadway. Vehicle position data may include vehicle identification information. Vehicle position data may further include geographic location information, velocity, direction of travel, or any other indication of the position of the vehicle. Vehicle identification information may be further provided from vehicles identifying make, model, type, size, associated fleets, and other information specific to the vehicle.

In act A110, the affected node is identified based on vehicle position. An affected node may be any one or more nodes that are affected by the change in vehicle position data. Identifying the affected node of the roadway may include determining whether affected nodes are in the forward path or in the wake of the path of the vehicle, as illustrated in act A112. A node in the wake of the path of the vehicle is a node that the vehicle has traversed or a node that a vehicle has departed from. An affected node in the wake of the path of the vehicle may be the last node traversed and/or last node the vehicle has departed from. A node in the forward path of the vehicle may be the next node in the direction of travel of the vehicle. The determination of whether a vehicle is approaching or departing a node may be based on the current position of the vehicle and direction of travel. Alternatively, the determination of whether the affected node is a node in the forward path of the vehicle or a node in the wake of the path of the vehicle may be based on the current position of the vehicle and one or more previous positions of the vehicle. Vehicles that are stopped at an intersection retain a vehicle location of the node associated with the intersection at which the vehicle is stopped and/or the last vehicle location. Vehicles at traffic signals, at slow or low motion due to congestion, or at stop signs, are some examples of instances in which vehicles may stop at or near an intersection.

In some embodiments, infrastructure information may be further used to determine the state of traffic of the roadway and its nodes. Infrastructure information may be received by server 125 via networking device 135, traffic device 137, or other source. Infrastructure information may include data associated with timed traffic light information associated with the traffic device 137, current traffic light timing information associated with sensor-based traffic light control, or other information associated with the traffic cluster. In act A120, infrastructure data is received. Infrastructure data may include traffic light duration data. Infrastructure data may be obtained from geographic database 116. For example, for traffic signals with pre-determined patterns may be stored in geographic database 116. Infrastructure data associated with changes in pre-determined patterns (e.g., emergency services vehicles preempting timed traffic signals) may be provided from traffic devices 137, vehicles 129, network devices 135 and stored as infrastructure data records 301.

In act A130, the roadway graph is updated. The roadway graph may be representative of at least a portion of the roadway and is updated based on affected nodes of the roadway. Each node at the roadway graph may include a weight indicating the state of traffic of the node. For example, the weight may be indicative of a number of vehicles stopped at the node, and/or a number of vehicles with the node in the forward path of the vehicle. Weights of the nodes of the roadway graph provide an indication of the traffic state at the intersection. The weight of affected nodes may be incremented if the affected node is a node in the forward path of the vehicle, as in act A132. Further, the weight of the affected node may be decremented if the affected node is in the wake of the path of the vehicle, as in act A134. A single movement of a vehicle may affect two nodes simultaneously; the vehicle may be simultaneously departing a node while it approaches another.

In embodiments in which infrastructure information is used to determine the state of traffic of the roadway and its nodes, updating the roadway graph data may include using the received infrastructure information in addition to the received vehicle position data. Infrastructure information may be used to further increment or decrement or otherwise scale the weight at a given node based on the current infrastructure state or known behavior of infrastructure elements.

In act A140, the vehicle route is optimized. Optimization of the route may be conducted based on the updated roadway graph. Optimizing the route of the vehicle based on the routing algorithm may further include calculating a best (e.g., fastest or shortest) route of the vehicle based on the weight of nodes along possible routes to a destination of the vehicle, as illustrated by act A142. Any known routing algorithm may be used. Routing algorithms may prioritize route decisions based on user entered preferences, fleet preferences, or other preferences.

In act A150, an indication of route change is provided. Indications of changes in the route may be provided to passenger of the vehicle on the roadway. Changing route directions to the vehicle may include providing graphical navigation information for display by the vehicle, as in act A152. Alternatively, or additionally, providing changing route directions to the vehicle may include providing instructions that control autonomous operation of the vehicle, as an act A154. Additionally, or alternatively, providing changing route directions to the vehicle may further include providing a selection of possible navigation options for selection by passenger of the vehicle in act A156. For example, selection of navigation options may be of use in embodiments including semi-autonomous operation of vehicles.

In one embodiment, vehicle position data may be received via network 127 from vehicle 129. Vehicle position information may be provided directly from vehicle 129 to server 125 or may be provided to server 125 via an intermediate networking device 135. Vehicle position information may be provided by combination of direct transmission from vehicle 129 and vehicle information data collected at an intermediate networking device 135 and transmitted to the server 125. These networking devices may be further used as intermediaries to provide optimized route information from server 125 to the vehicle.

In other embodiments, the server may transmit roadway graph information and transmit updated graph information to the vehicle or intermediate networking device 135. The vehicle or networking device may then use the updated roadway graph information in order to optimize route information for individual vehicles.

Node-centric optimization may be performed using vehicle position information of some or all vehicles with in a geographic area. Some vehicles may not be capable of providing vehicle position information, and thus, those vehicles may not be reflected in the roadway graph. Optimization is provided for specific groups of vehicles. For example, fleets of vehicles may be centrally owned or operated. The interests of these groups of vehicles can be catered to by creating roadway graphs with vehicle input from only vehicles identified as belonging to the group. In some embodiments, vehicle information may be used to update a roadway graph that is restricted to a group of vehicles. For example, a fleet of vehicles, such as taxis may have unique optimization needs such as maximizing speed, maximizing flag-pulls, reducing idle time, remaining within a specific geographic region, or other desired results. Larger commercial vehicles may constitute a separate group, with optimization needs such as maximizing straightaways, reducing rapid changes in acceleration or velocity or favoring roadways including separate turn lanes or multiple lanes. Larger commercial vehicle fleets may further minimize paths crossing intersections with short traffic light signal times.

Figure 2:
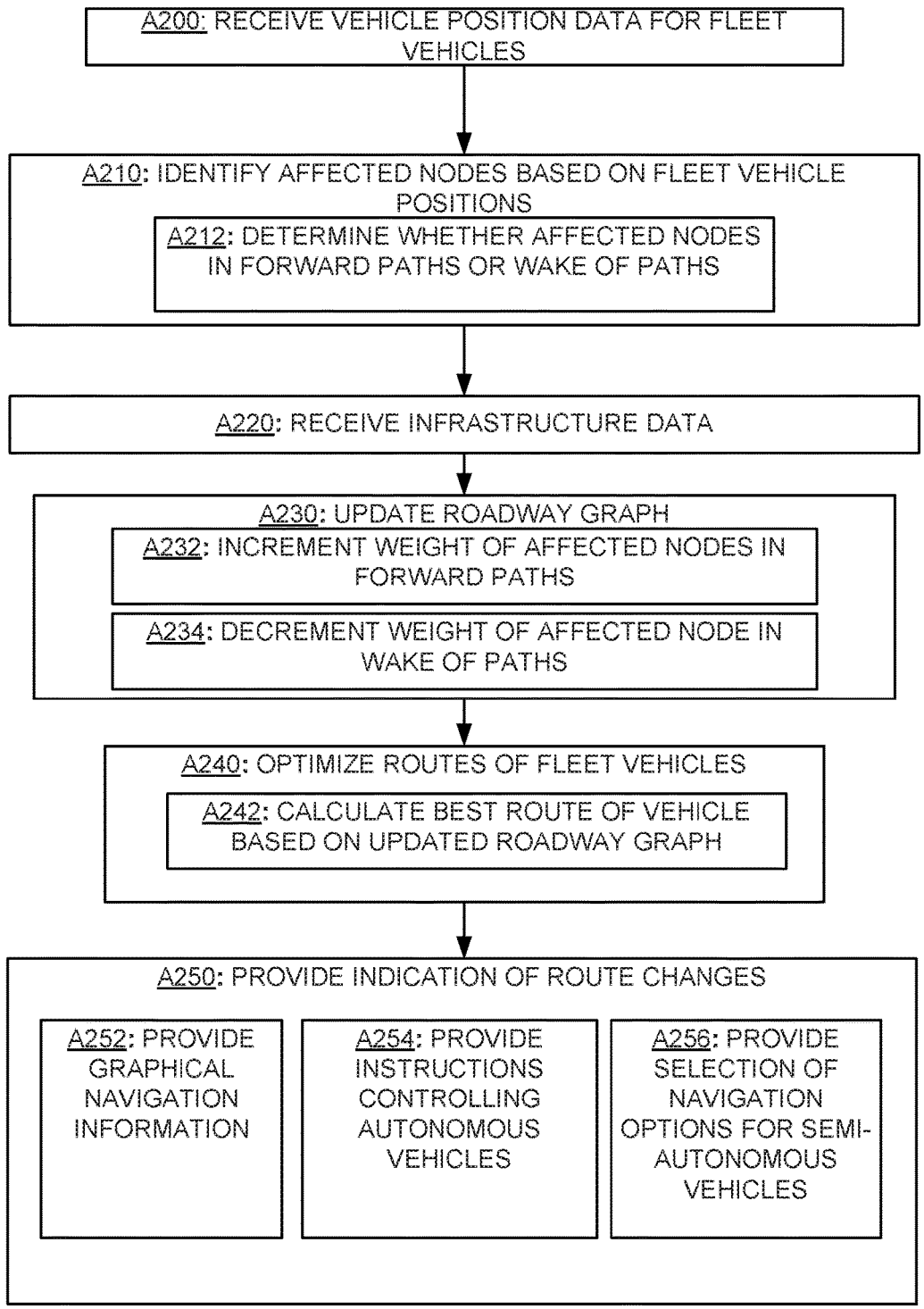
FIG. 2 is a flow diagram in accordance with the subject technology for node-centric navigation optimization.

FIG. 2 is a flow diagram in accordance with the subject technology for node-centric navigation optimization for a selected fleet of vehicles. Acts are described with reference to the system and components depicted in FIGS. 5-7. Additional, different, or fewer acts may be provided. Acts may be performed in orders other than those presented herein. For example, some embodiments may not include act A220. In other embodiments, act A240 may be performed using acts other than A242. In act A200, vehicle position data is received for fleet vehicles. Vehicle position data is received for each vehicle of the fleet on roadways of a geographic area.

In act A210, affected nodes are identified based on fleet vehicle positions. Affected nodes of the roadways are identified based on vehicle position data of each vehicle of the group of associated vehicles. Identification of the affected nodes may include act A212. As in act A212, it is determined whether each respective affected node is in a forward path of any vehicle of the plurality of associated vehicles or in a wake of a path of any vehicle of the plurality of associated vehicles. Identifying the nodes of the roadway in the geographic area may include determining whether did nodes are in the forward path or in the wake of the path of fleet vehicles, as an act A212. This determination of whether a vehicle is approaching or departing a node may be based on the current position of the vehicle and direction of travel.

In act A220, infrastructure data is received. Optimizing the route of the vehicle based on the routing algorithm may further include calculating a best route of the vehicle based on the weight of nodes along possible routes to a destination of the vehicle, as illustrated by act A242. A best route may be a shortest distance, a shortest travel time, a route maximizing desired roadway characteristics, or a combination thereof.

In act A230, the roadway graph is updated. The roadway graph, representative of roadways of the geographic area, is updated based on the one or more affected nodes of the roadways. The weight of affected nodes may be incremented if the affected node is a node in the forward path of the vehicle, as illustrated in act A232. Further, the weight of the affected node may be decremented if the affected node is in the wake of the path of the vehicle, as in act A234.

In act A240, routes are optimized for fleet vehicles. The routes are optimized for each vehicle in the fleet. Optimizing the route of the vehicle based on the routing algorithm may further include calculating a fastest route of the vehicle based on the weight of nodes along possible routes to a destination of the vehicle, as illustrated by act A142. Any known routing algorithm may be used. Routing algorithms may prioritize route decisions based on user entered preferences, fleet preferences, or other preferences.

In act A250, an indication of changes in the route to vehicles are provided. Indications of changes in the route may be provided to passenger of the vehicle on the roadway. Changing route directions to the vehicle may include providing graphical navigation information for display by the vehicle, as in act A252. Alternatively, or additionally, providing changing route directions to the vehicle may include providing instructions that control autonomous operation of the vehicle, as an act A254. Additionally, or alternatively, providing changing route directions to the vehicle may further include providing a selection of possible navigation options for selection by passenger of the vehicle. For example, selection of navigation options may be of use in embodiments including semi-autonomous operation of vehicles, as in act A256.

Figure 3A:
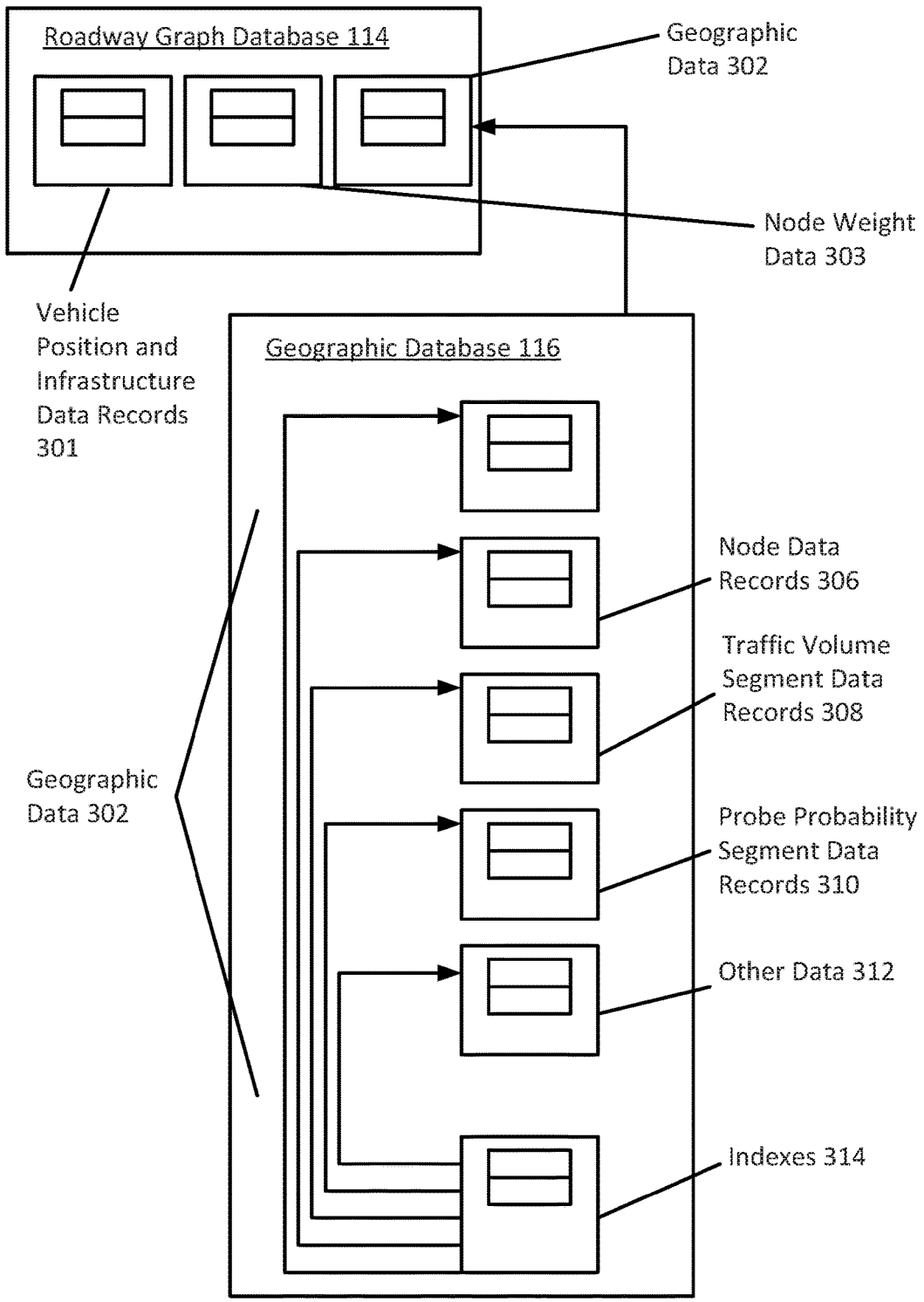
FIG. 3A illustrates a block diagram of a roadway graph database and a geographic database in accordance with the subject technology for node-centric navigation optimization.

FIG. 3A illustrates a block diagram of roadway graph database 114 and geographic database 116 in accordance with the subject technology for node-centric navigation optimization. In one embodiment, the geographic database 116 contains data 302 that represents some of the physical geographic features in the geographic area of FIG. 4A. The data in roadway graph database 114 may include vehicle position information 301 received from vehicles traveling through the geographic area 400. Infrastructure information, if available, may further be included in data records 301. This information may be updated in real time and upon receipt. Current vehicle position and infrastructure data records 301 may be received directly from vehicles 129, network devices 135, and traffic devices 137 via network 127. That is, while additional traffic congestion information may be available via geographic database 116 or other sources, the roadway graph database does not rely on traffic volume data and/or traffic congestion data from conventional sources such as traffic channels, radio, or other aggregated traffic data. The geographic data 302 may include node data records 306 and other information defining the geographic area 400. Node weight data 303 includes current weight values of nodes in the geographic area based on vehicle position and infrastructure data records 301.

Figure 4A:
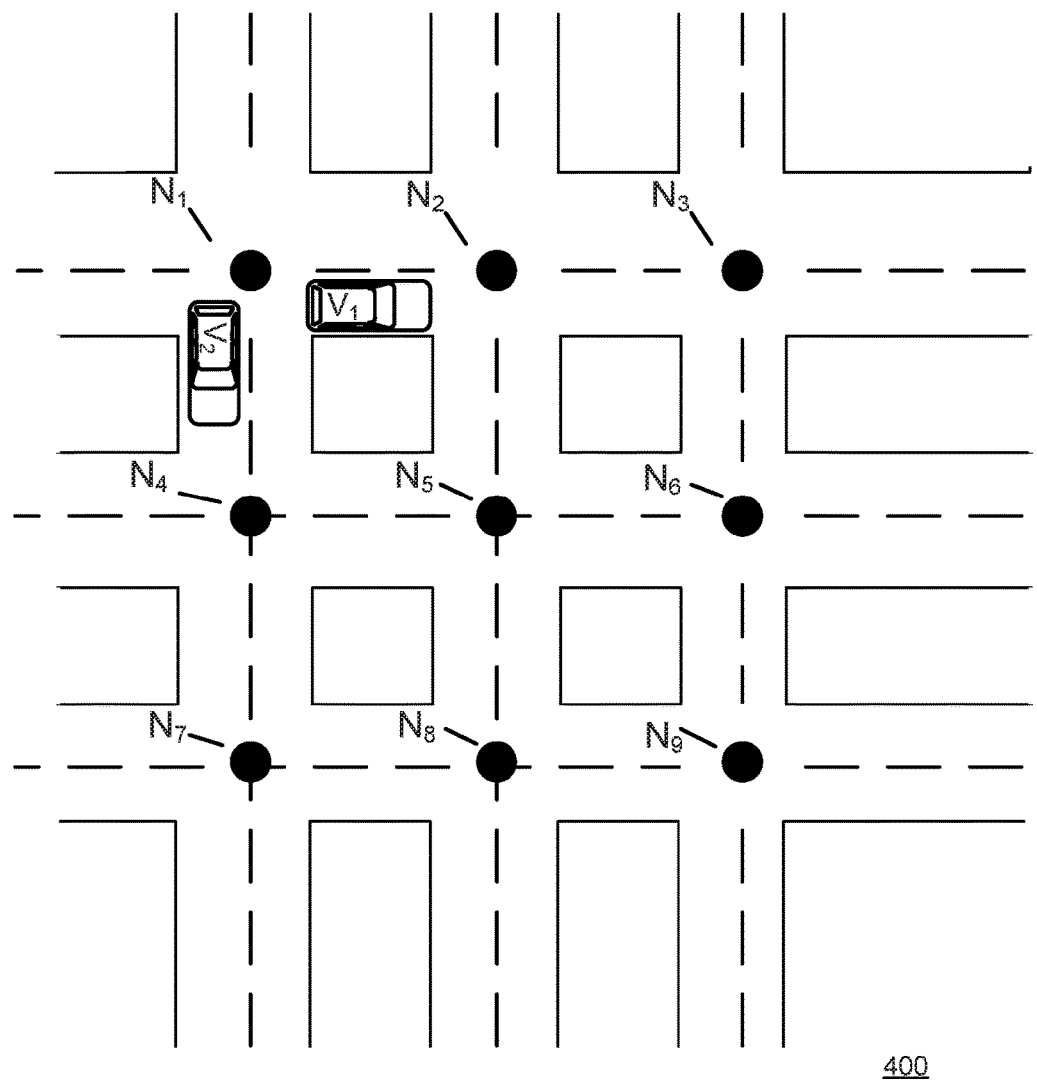
FIGS. 4A-4H illustrate vehicles moving with respect to nodes of the roadway in accordance with the subject technology for node-centric navigation optimization.

The data 302 contained in the geographic database 116 may include data that represents the road network of geographic area 400 of FIG. 4A. Geographic database 116 may represent the geographic area 400 and may contain at least one road segment database record 304 (also referred to as "entity" or "entry") for each road segment in the geographic area 400. The geographic database 116 that represents the geographic area 400 may also include a node database record 306 (or "entity" or "entry") for each node $N_1$-$N_9$ in the geographic area 400. The terms "nodes" and "segments" represent only one terminology for describing physical geographic features, and other terminology for describing features is intended to be encompassed within the scope of these concepts.

The geographic database 116 may also include other kinds of data 312. The other kinds of data 312 may represent other kinds of geographic features or anything else. The other kinds of data may include point of interest data. For example, the point of interest data may include point of interest records including a type (e.g., the type of point of interest, such as restaurant, hotel, city hall, police station, historical marker, ATM, golf course, etc.), location of the point of interest, a phone number, hours of operation, etc. The geographic database 116 also includes indexes 314. The indexes 314 may include various types of indexes that relate the different types of data to each other or that relate to other aspects of the data contained in the geographic database 116. For example, the indexes 314 may relate the nodes in the node data records 306 with the end points of a road segment in the road segment data records 304. As another example, the indexes 314 may relate point of interest data in the other data records 312 with a road segment in the segment data records 304.

Figure 3B:
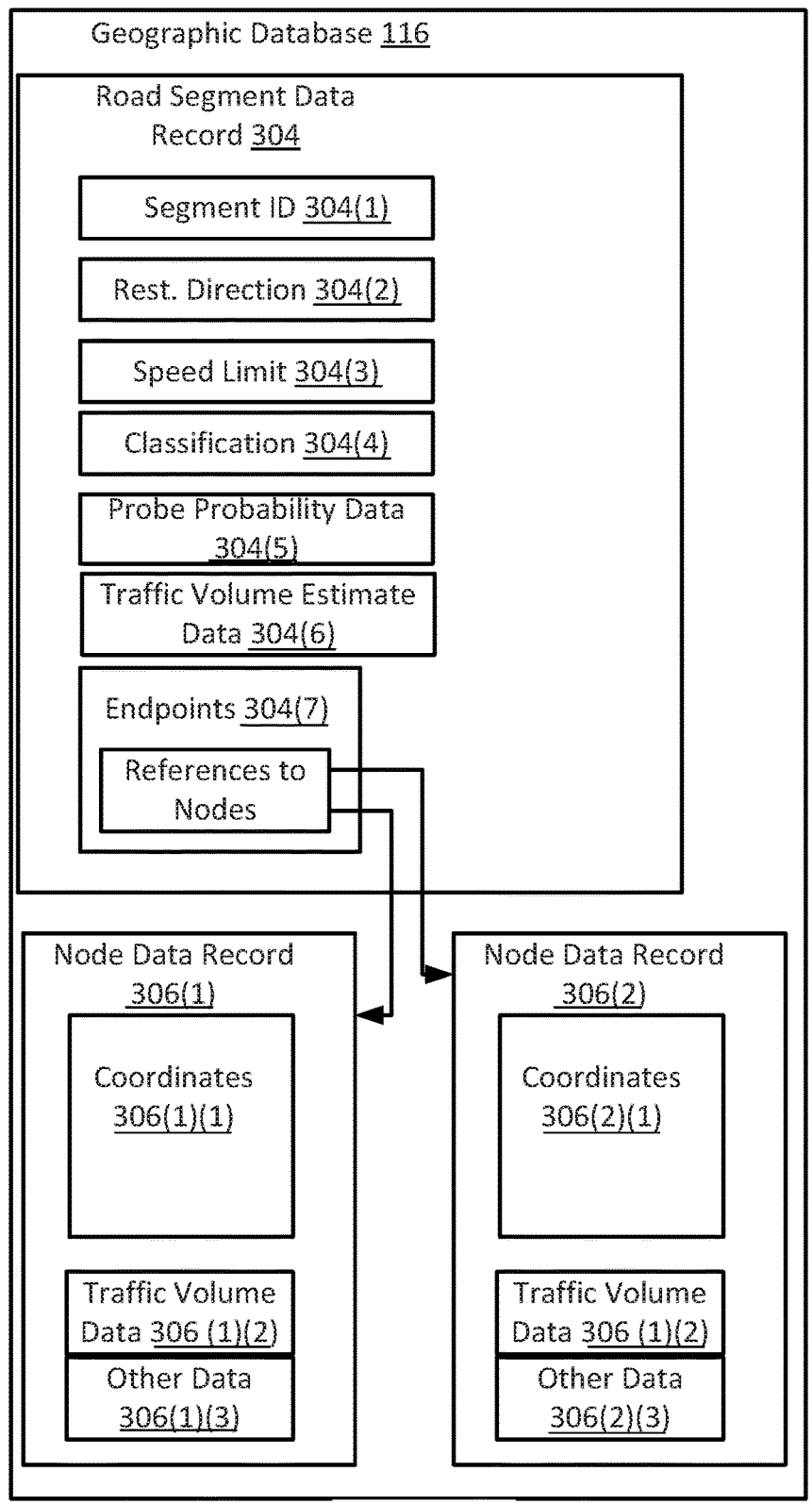
FIG. 3B illustrates a block diagram of components of data records contained in the geographic database of FIG. 3A.

FIG. 3B illustrates a block diagram of components of data records contained in the geographic database of FIG. 3. Some or all of the components of a road segment data record 304 may be contained in the geographic database 116 according to one embodiment. The road segment data record 304 may include a segment ID 304(1) by which the data record may be identified in the geographic database 116. Each road segment data record 304 may be associated with information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include data 304(4) indicating whether the represented road segment is part of a controlled access road (such as an expressway), a ramp to a controlled access road, a bridge, a tunnel, a toll road, a ferry, and so on.

Data for traffic volume may be stored as separate records 308, 310 or in road segment data records 304. The geographic database 116 may include road segment data records 304 (or data entities) that describe features such as traffic volume 304(5) or traffic volume estimations 304(6). The estimated volume may be stored as a field or record using a scale of values such as from 1 to 100 (1 being low volume, 100 being high volume) or based on a measurement scale such as vehicles per meter (or square meter), or range thereof. The estimated traffic volume may be stored using categories such as low, medium, high. Additional schema may be used to describe the estimated traffic volume. The geographic database 116 may store other data 312 relating to volume such as raw un-adjusted data. The attribute data may be stored in relation to a link/segment 304, a node 306, a strand of links, an area, or a region. The geographic database 116 may store information or settings for display preferences. The geographic database 116 may be coupled to a display. The display may be configured to display the roadway network and data entities using different colors or schemes. The geographic database 116 may store information relating to where hazardous conditions may exist, for example, though analysis of the data records and current/historical traffic conditions. Road segments with high traffic volume may be used to identify or supplement other data entities such as potential hazards. High volume along with geographic data records such as high speeds may indicate through a combination of conditions that location on a roadway is not safe.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points or sub-segments of the represented road segment.

The road segment data record 304 may also include or be associated with other data 304(7) that refer to various other attributes of the represented road segment. The various attributes associated with a road segment may be included in a single road segment record, or may be included in more than one type of record that cross-references to each other. For example, the road segment data record 304 may include data identifying what turn restrictions exist at each of the nodes that correspond to intersections at the ends of the road portion represented by the road segment, the name or names by which the represented road segment is known, the street address ranges along the represented road segment, and so on.

FIG. 3B also depicts some of the components of a node data record 306 that may be contained in the geographic database 116. Each of the node data records 306 may have associated information (such as "attributes", "fields", etc.) that allows identification of the road segment(s) that connect to it and/or the node's geographic position (e.g., its latitude and longitude coordinates). Node data records 306(1) and 306(2) may include the latitude and longitude coordinates 306(1)(1) and 306(2)(1) for their node. The node data records 306(1) and 306(2) may also include other data 306(1)(3) and 306(2)(3) that refer to various other attributes of the nodes.

The geographic database 116 may be maintained by a content provider (e.g., a map developer). By way of example, the map developer may collect geographic data to generate and enhance the geographic database 116. The map developer may obtain data from sources, such as businesses, municipalities or respective geographic authorities. In addition, the map developer may employ field personnel to travel throughout the geographic region to observe features and/or record information about the roadway. Remote sensing, such as aerial or satellite photography, may be used. The database 116 is connected to the server 125.

The geographic database 116 and the data stored within the geographic database 116 may be licensed or delivered on-demand. Other navigational services or traffic server providers may access the traffic data and the estimated traffic volume data stored in the geographic database 116. Data including the estimated traffic volume data for a link may be broadcast as a service.

The server 125 may be a host for a website or web service such as a mapping service and/or a navigation service. The mapping service may provide maps generated from the geographic data of the database 116, and the navigation service may generate routing or other directions from the geographic data of the database 116. The mapping service may also provide information generated from attribute data included in the database 116. The server 125 may also provide historical, future, recent or current traffic conditions for the links, segments, paths, or routes using historical, recent, or real time collected data. The server 125 may be configured to analyze collected volume data and/or probe reports to determine an estimated traffic volume for segments or links. The server 125 may be configured to analyze data from segments and links to determine correlations between similar types of segments and nodes. For example, segments with similar volumes use may have similar accident profiles or traffic patterns.

FIGS. 4A-4H illustrate vehicles moving with respect to nodes of the roadway in accordance with the subject technology for node-centric navigation optimization. FIG. 4A illustrates a geographic area 400 including several roadways and intersections. Each intersection corresponds to a node in $N_1$-$N_8$. Each roadway may include one or multiple directions of travel and one or more lanes vehicles $V_1$ and $V_2$ are traveling through the geographic area. Vehicle $V_1$ begins at $N_1$ with the destination of $N_9$. Vehicle $V_1$ has an initial route planned of traveling from $N_1$ to $N_2$ to $N_3$ to $N_6$, and on to its destination $N_9$. Vehicle $V_2$ also begins at $N_1$ with a destination of node $N_9$. The example begins with vehicle $V_2$ having a current route to reach destination node $N_9$ following $N_1$ to $N_4$ to $N_5$ to $N_6$ to reach destination $N_9$. The route of Vehicle $V_2$ has already been adjusted to avoid congestion based on the current position of Vehicle $V_1$. FIGS. 4B-4H represent a simplified view of the geographic area of FIG. 4A.

Figure 4B:
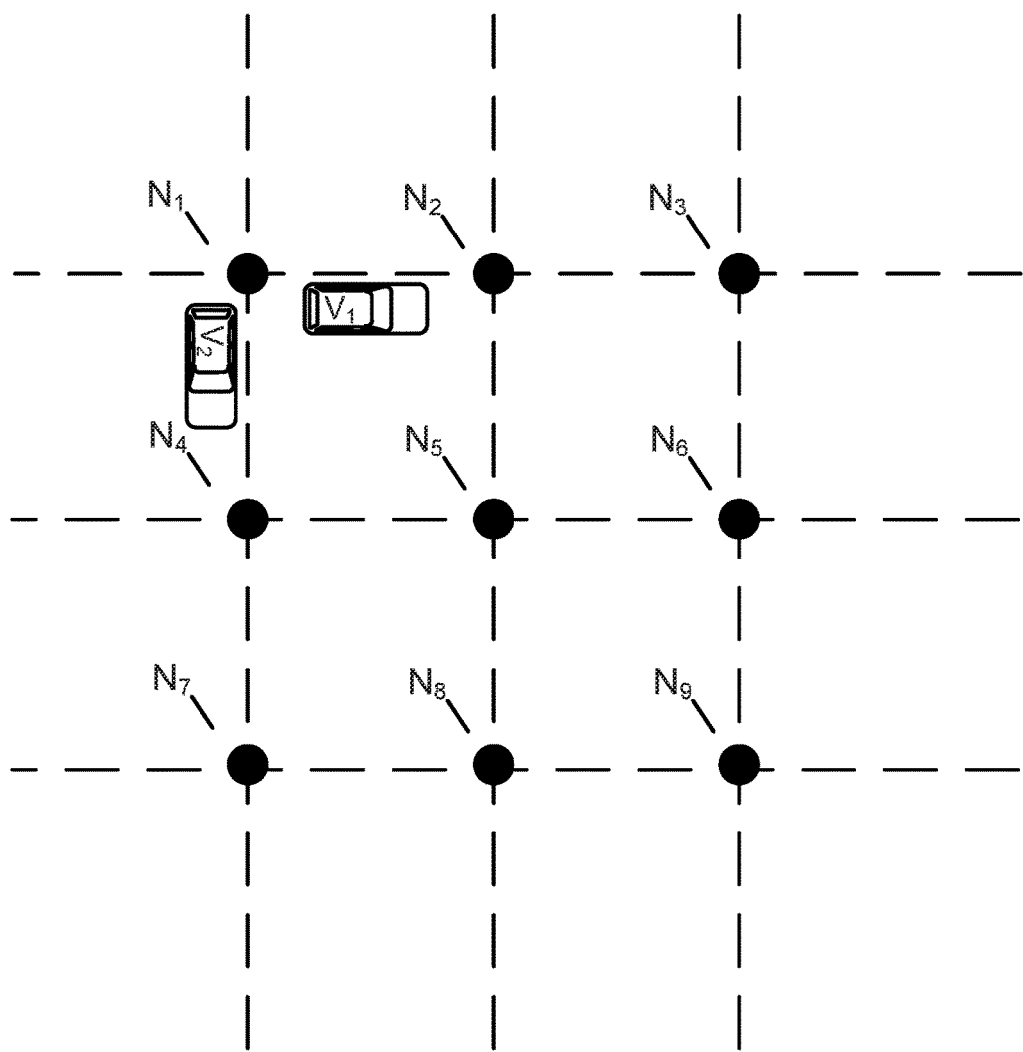

FIG. 4B illustrates Vehicles $V_1$ and $V_2$ at the same point in time as they appear in FIG. 4A. FIG. 4B through 4H. The vehicle locations of FIG. 4B are provided in Table 1 below. Vehicles location may be described in terms of the node it is approaching in the direction of the vehicles path. Vehicle $V_1$ in FIG. 4B is departing node $N_1$ and approaching node $N_2$; the location of Vehicle $V_1$ is expressed as node $N_2$. Vehicle $V_2$ has a location of node $N_4$ because it is traveling from $N_1$ to $N_4$.

TABLE 1

Vehicle Locations: FIG. 4B

| $N_1$ | $N_2$ $V_1$ | $N_3$ |
|---|---|---|
| $N_4$ $V_2$ | $N_5$ | $N_6$ |
| $N_7$ | $N_8$ | $N_9$ |

Each vehicle locations influences the roadway graph based its current location and direction. Vehicle $V_1$ departs node $N_1$ and approaches node $N_2$. Accordingly, vehicle $V_1$ affects both node $N_1$ and $N_2$ in the roadway graph. Table 2 illustrates values of the roadway graph corresponding to FIG. 4B that provides the weight of the node with respect to each node to which it is connected. The weight of the node is based on the number of vehicles approaching the node and based on the number of vehicles departing the node. As shown in the roadway graph of FIG. 4B, vehicle $V_1$ is approaching node $N_2$ and departing node $N_1$. Thus, the weight at node $N_1$ has a value of zero with respect to node $N_2$ and a value of zero with respect to node $N_4$. Node $N_2$ of the roadway graph has a weight of one with respect to $N_1$ because vehicle $V_1$ approaches node $N_2$ from $N_1$. Vehicle $V_2$ approaches $N_4$ from node $N_1$. Thus the roadway graph weight value for node $N_4$ is one with respect to node $N_1$. The weight of node $N_1$ is zero with respect to node $N_4$ because vehicle $V_2$ is departing node $N_1$ and approaching node $N_4$. The remaining values of the roadway graph are zero, indicating no other vehicles are traveling through or stopped at an intersection in the geographic area. The route of vehicle $V_1$ is unchanged because the roadway graph values for the route of vehicle $V_1$ does not show any congestion.

TABLE 2

Roadway Graph: FIG. 4B

| $N_1$ $\{N_2: 0, N_4: 0\}$ | $N_2$ $\{N_1: 1, N_3: 0, N_5: 0\}$ | $N_3$ $\{N_2: 0, N_6: 0\}$ |
|---|---|---|
| $N_4$ $\{N_1: 1, N_5: 0, N_7: 0\}$ | $N_5$ $\{N_8: 0, N_2: 0, N_4: 0, N_6: 0\}$ | $N_6$ $\{N_9: 0, N_3: 0, N_5: 0\}$ |
| $N_7$ $\{N_8: 0, N_4: 0\}$ | $N_8$ $\{N_9: 0, N_5: 0, N_7: 0\}$ | $N_9$ $\{N_8: 0, N_6: 0\}$ |

Figure 4C:
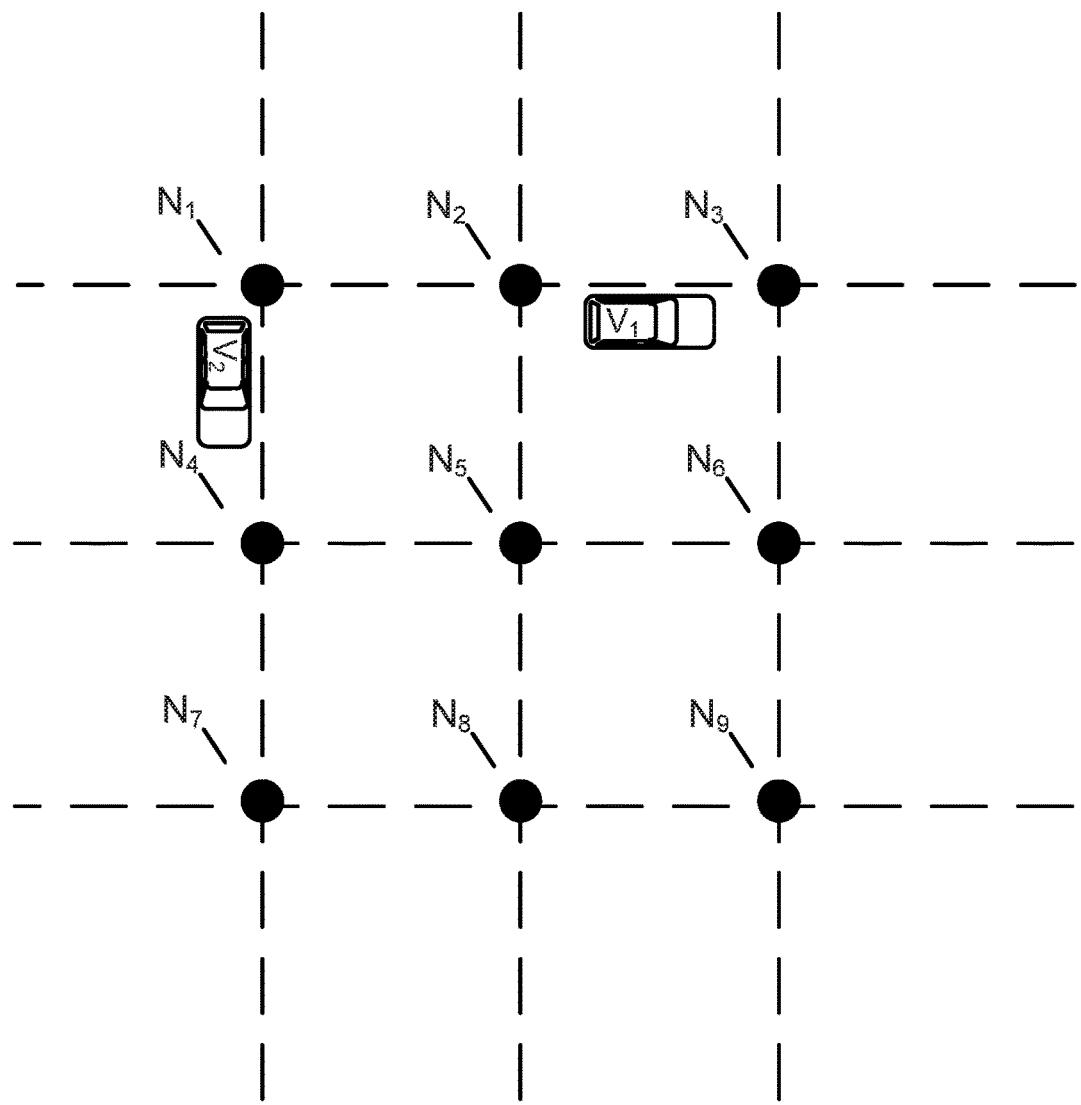

FIG. 4C illustrates the next increment of the path of vehicle $V_1$ for node $N_2$ to node $N_3$. Vehicle $V_1$ departs node $N_2$ and approaches node $N_3$. Accordingly, Table 3 below corresponds to the vehicle locations of FIG. 4C. Node $N_3$ is the new, current location of vehicle $V_1$. No changes shown in vehicle $V_2$; thus, the location of Vehicle $V_2$ is node $N_4$.

TABLE 3

Vehicle Locations: FIG. 4C

| $N_1$ | $N_2$ | $N_3$ $V_1$ |
|---|---|---|
| $N_4$ $V_2$ | $N_5$ | $N_6$ |
| $N_7$ | $N_8$ | $N_9$ |

Node $N_2$ is now in the wake of vehicle $V_1$. Accordingly, the corresponding roadway graph for FIG. 4C decrements the weight of $N_2$ with respect to node $N_1$ to zero and increments the weight of node $N_3$ with respect to node $N_2$ to one, as depicted in Table 4. The weight of node $N_4$ remains constant.

TABLE 4

Roadway Graph: FIG. 4C

| $N_1$ $\{N_2: 0, N_4: 0\}$ | $N_2$ $\{N_1: 0, N_3: 0, N_5: 0\}$ | $N_3$ $\{N_2: 1, N_6: 0\}$ |
|---|---|---|
| $N_4$ $\{N_1: 1, N_5: 0, N_7: 0\}$ | $N_5$ $\{N_8: 0, N_2: 0, N_4: 0, N_6: 0\}$ | $N_6$ $\{N_9: 0, N_3: 0, N_5: 0\}$ |
| $N_7$ $\{N_8: 0, N_4: 0\}$ | $N_8$ $\{N_9: 0, N_5: 0, N_7: 0\}$ | $N_9$ $\{N_8: 0, N_6: 0\}$ |

No vehicles create congestion in the existing path of the vehicles; thus, the route of each of the vehicles do not change based on changes in the roadway graph from FIG. 4B to FIG. 4C.

Figure 4D:
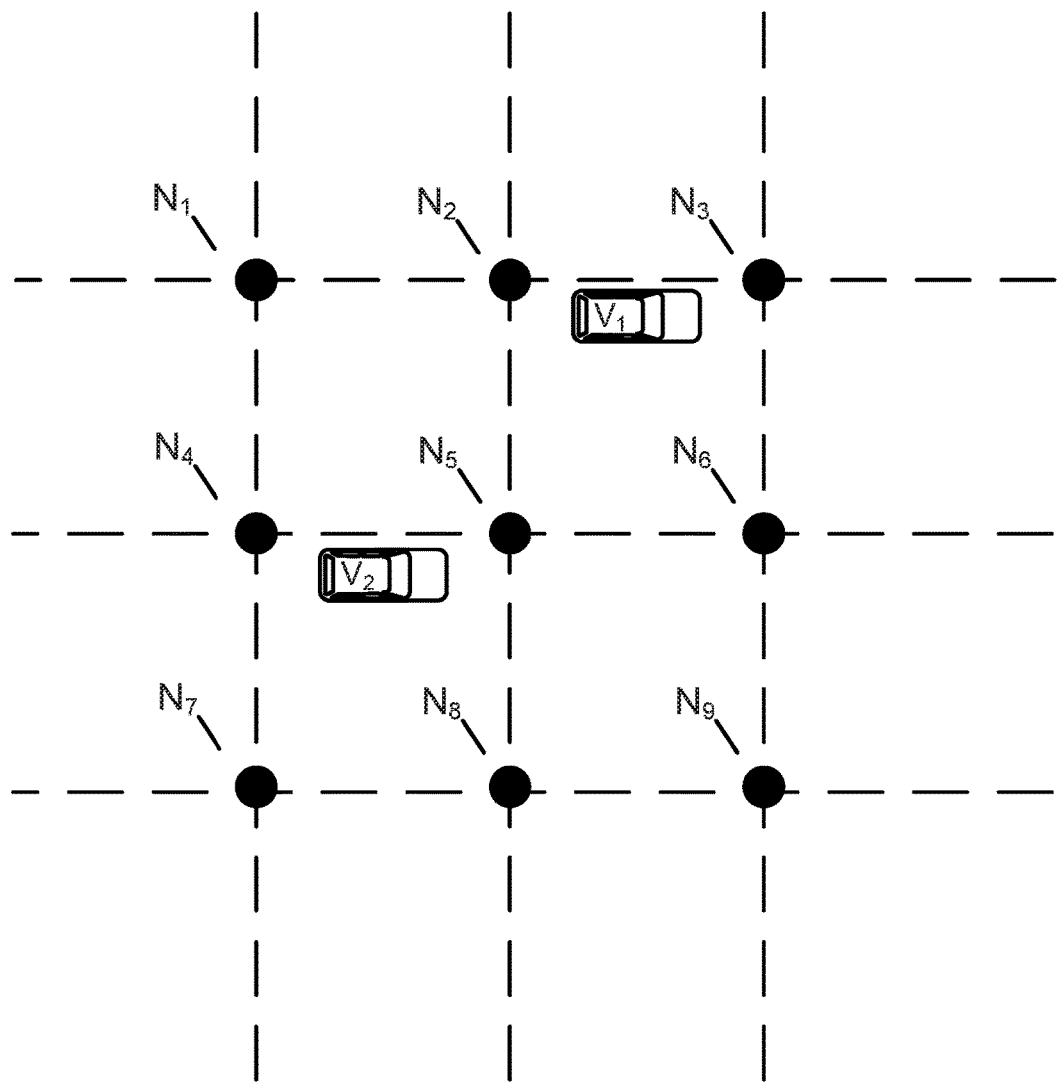

FIG. 4D illustrates the next increment of the path of vehicle $V_2$ departing node $N_4$ and approaching node $N_5$. Table 5, the vehicle location table corresponding to FIG. 4D, accordingly shows the location of vehicle $V_2$ at node $N_5$. No change is made in the location of vehicle $V_1$.

TABLE 5

Vehicle Locations: FIG. 4D

| $N_1$ | $N_2$ | $N_3$ $V_1$ |
|---|---|---|
| $N_4$ | $N_5$ $V_2$ | $N_6$ |
| $N_7$ | $N_8$ | $N_9$ |

Vehicle $V_2$ departs node $N_4$; thus, the roadway graph corresponding to FIG. 4D decrements the weight of node $N_4$ with respect to node $N_5$ to zero and increments the weight of node $N_5$ with respect to node $N_4$, reflecting the path of vehicle $V_2$. Optimization of the routes of the vehicles require no changes based on changes to the roadway graph corresponding to FIG. 4D.

TABLE 6

Roadway Graph: FIG. 4D

| $N_1$ $\{N_2: 0, N_4: 0\}$ | $N_2$ $\{N_1: 0, N_3: 0, N_5: 0\}$ | $N_3$ $\{N_2: 1, N_6: 0\}$ |
|---|---|---|
| $N_4$ $\{N_1: 0, N_5: 0, N_7: 0\}$ | $N_5$ $\{N_8: 0, N_2: 0, N_4: 1, N_6: 0\}$ | $N_6$ $\{N_9: 0, N_3: 0, N_5: 0\}$ |
| $N_7$ $\{N_8: 0, N_4: 0\}$ | $N_8$ $\{N_9: 0, N_5: 0, N_7: 0\}$ | $N_9$ $\{N_8: 0, N_6: 0\}$ |

Figure 4E:
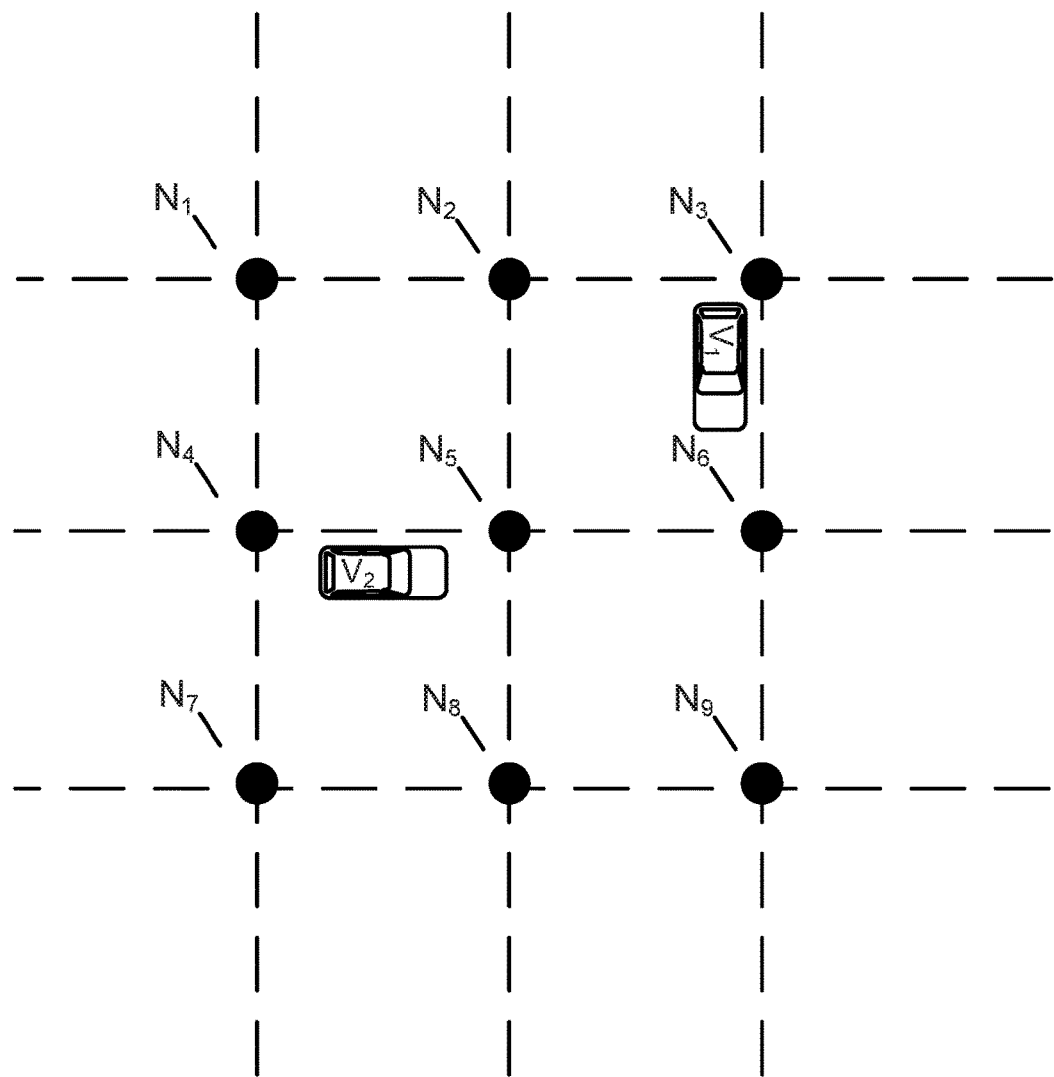

FIG. 4E illustrates the subsequent path of Vehicle $V_1$ departing node $N_3$ and approaching node $N_6$. The corresponding vehicle location table for FIG. 4E, Table 7, illustrates the current location of Vehicle $V_1$ as node $N_6$.

TABLE 7

Vehicle Locations: FIG. 4E

| $N_1$ | $N_2$ | $N_3$ |
|---|---|---|
| $N_4$ | $N_5$ $V_2$ | $N_6$ $V_1$ |
| $N_7$ | $N_8$ | $N_9$ |

The roadway graph values, provided in Table 8, correspond to FIG. 4E. The weight of node $N_3$ is decremented with respect to node $N_6$ to zero and weight of node $N_6$ (with respect to node $N_3$) is incremented to a value of one. The incrementation of the weight of node $N_6$ with respect to node $N_3$ presents a significant change to the best path of Vehicle $V_2$. That is, the current route of vehicle $V_2$ leads from node $N_5$ to node $N_6$ to node $N_9$. The changes to the roadway graph values corresponding to FIG. 4E now indicate that vehicle the route of vehicle $V_2$ is optimized as a path leading from node $N_5$ to node $N_8$ to reach destination node $N_9$. Thus, an indication of the route change may be provided to the vehicle.

TABLE 8

Roadway Graph: FIG. 4E

| $N_1$ | $N_2$ | $N_3$ |
|---|---|---|
| {$N_2$: 0, $N_4$: 0} | {$N_1$: 0, $N_3$: 0, $N_5$: 0} | {$N_2$: 0, $N_6$: 0} |
| $N_4$ | $N_5$ | $N_6$ |
| {$N_1$: 0, $N_5$: 0, $N_7$: 0} | {$N_8$: 0, $N_2$: 0, $N_4$: 1, $N_6$: 0} | {$N_9$: 0, $N_3$: 1, $N_5$: 0} |
| $N_7$ | $N_8$ | $N_9$ |
| {$N_8$: 0, $N_4$: 0} | {$N_9$: 0, $N_5$: 0, $N_7$: 0} | {$N_8$: 0, $N_6$: 0} |

Figure 4F:
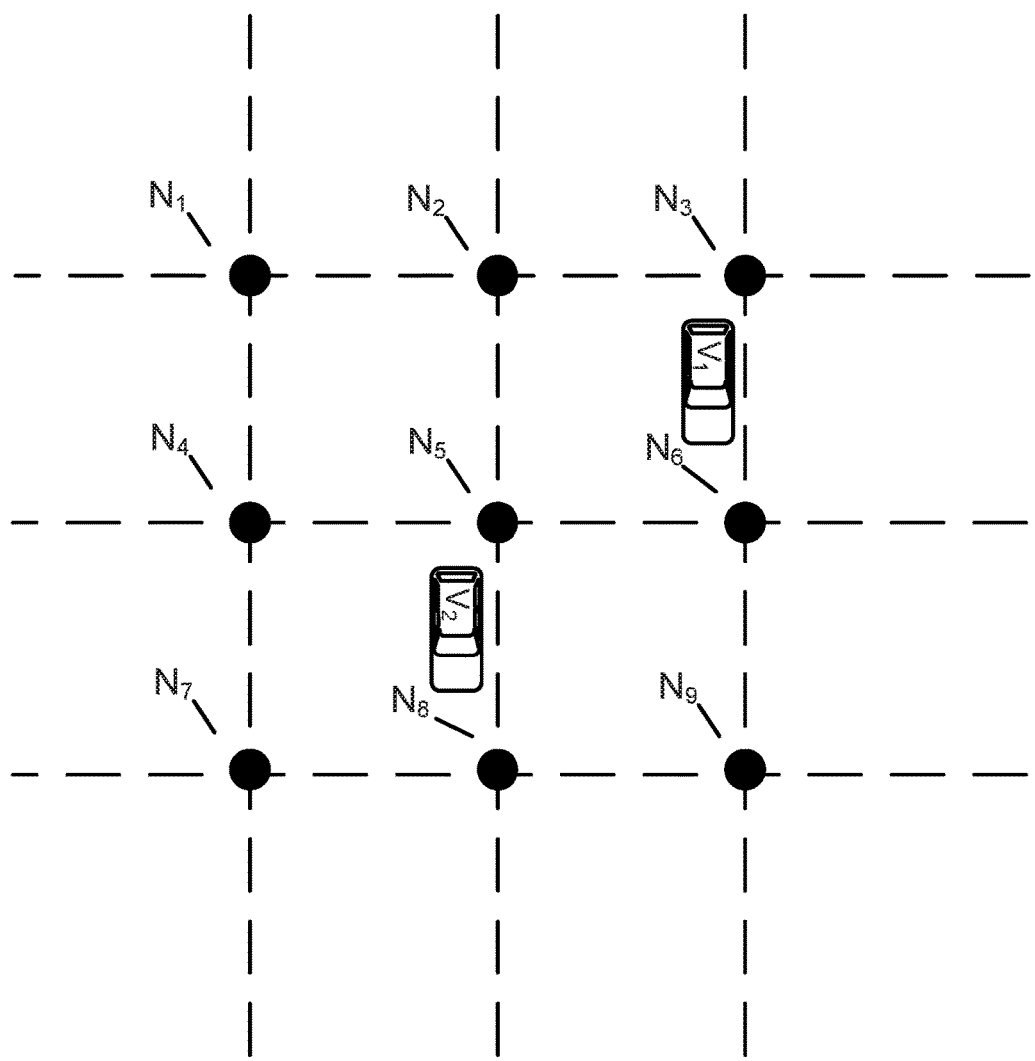

Implementing the route change, FIG. 4F illustrates the path of vehicle $V_2$ leaving node $N_5$ in the direction of node $N_8$. The corresponding vehicle location table for FIG. 4F, given as Table 9, contains the current location of vehicle $V_2$ as node $N_8$.

TABLE 9

Vehicle Locations: FIG. 4F

| $N_1$ | $N_2$ | $N_3$ |
|---|---|---|
| $N_4$ | $N_5$ | $N_6$ |
|  |  | V1 |
| $N_7$ | $N_8$ | $N_9$ |
|  | $V_2$ |  |

The roadway graph values illustrated in Table 10 corresponds to FIG. 4F. The weight of node $N_5$ is decremented with respect to node $N_4$ to zero, and the weight of node $N_8$ with respect to node $N_5$ is incremented to one.

TABLE 10

Roadway Graph: FIG. 4F

| $N_1$ | $N_2$ | $N_3$ |
|---|---|---|
| {$N_2$: 0, $N_4$: 0} | {$N_1$: 0, $N_3$: 0, $N_5$: 0} | {$N_2$: 0, $N_6$: 0} |
| $N_4$ | $N_5$ | $N_6$ |
| {$N_1$: 0, $N_5$: 0, $N_7$: 0} | {$N_8$: 0, $N_2$: 0, $N_4$: 0, $N_6$: 0} | {$N_9$: 0, $N_3$: 1, $N_5$: 0} |
| $N_7$ | $N_8$ | $N_9$ |
| {$N_8$: 0, $N_4$: 0} | {$N_9$: 0, $N_5$: 1, $N_7$: 0} | {$N_8$: 0, $N_6$: 0} |

Figure 4G:
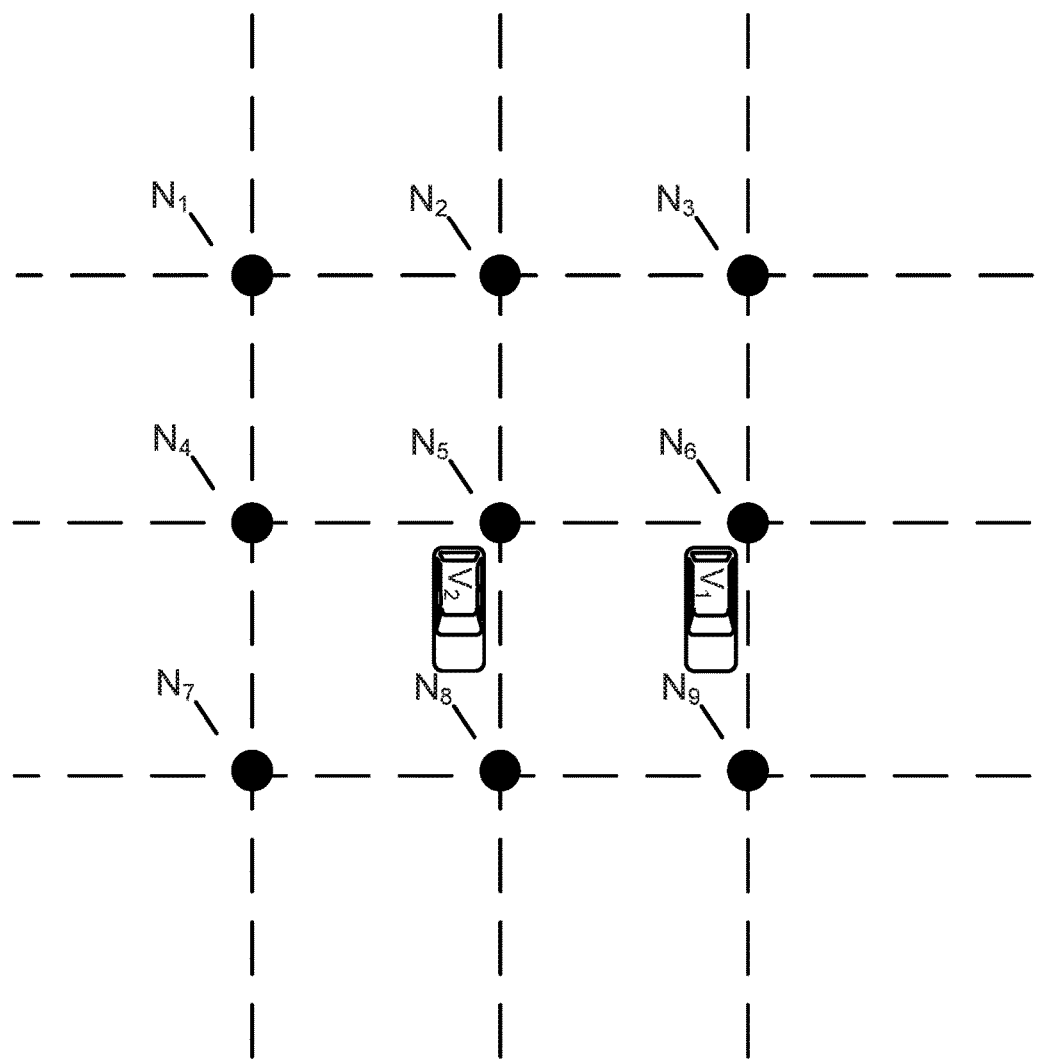

Vehicle $V_1$ moves from node $N_6$ to node $N_9$ in FIG. 4G. Table 11, the corresponding vehicle location table, thus shows the location of vehicle $N_1$ as node $N_9$.

TABLE 11

Vehicle Locations: FIG. 4G

| $N_1$ | $N_2$ | $N_3$ |
|---|---|---|
| $N_4$ | $N_5$ | $N_6$ |

TABLE 11-continued

Vehicle Locations: FIG. 4G

| $N_7$ | $N_8$ | $N_9$ |
|---|---|---|
|  | $V_2$ | $V_1$ |

The corresponding roadway graph for FIG. 4G increments the value of node $N_9$ with respect to node $N_6$ and decrements the value of node $N_6$ with respect to $N_3$. Values of the Roadway Graph are provided in Table 12. Optimization of the routes of the vehicles require no changes based on changes to the roadway graph corresponding to FIG. 4G.

TABLE 12

Roadway Graph: FIG. 4G

| $N_1$ | $N_2$ | $N_3$ |
|---|---|---|
| {$N_2$: 0, $N_4$: 0} | {$N_1$: 0, $N_3$: 0, $N_5$: 0} | {$N_2$: 0, $N_6$: 0} |
| $N_4$ | $N_5$ | $N_6$ |
| {$N_1$: 0, $N_5$: 0, $N_7$: 0} | {$N_8$: 0, $N_2$: 0, $N_4$: 0, $N_6$: 0} | {$N_9$: 0, $N_3$: 0, $N_5$: 0} |
| $N_7$ | $N_8$ | $N_9$ |
| {$N_8$: 0, $N_4$: 0} | {$N_9$: 0, $N_5$: 1, $N_7$: 0} | {$N_8$: 0, $N_6$: 1} |

Vehicle $V_1$ has thus reached its destination of node $N_9$. Vehicle $V_1$ may proceed into a parking lot or street parking and the ignition may be turned off. Accordingly, once vehicle $V_1$ no longer appears on the roadway, the vehicle no longer appears with respect to the vehicle location table or the roadway graph. Corresponding node weights associated with Vehicle $V_1$ are decremented accordingly, as shown in the FIG. 4H.

Figure 4H:
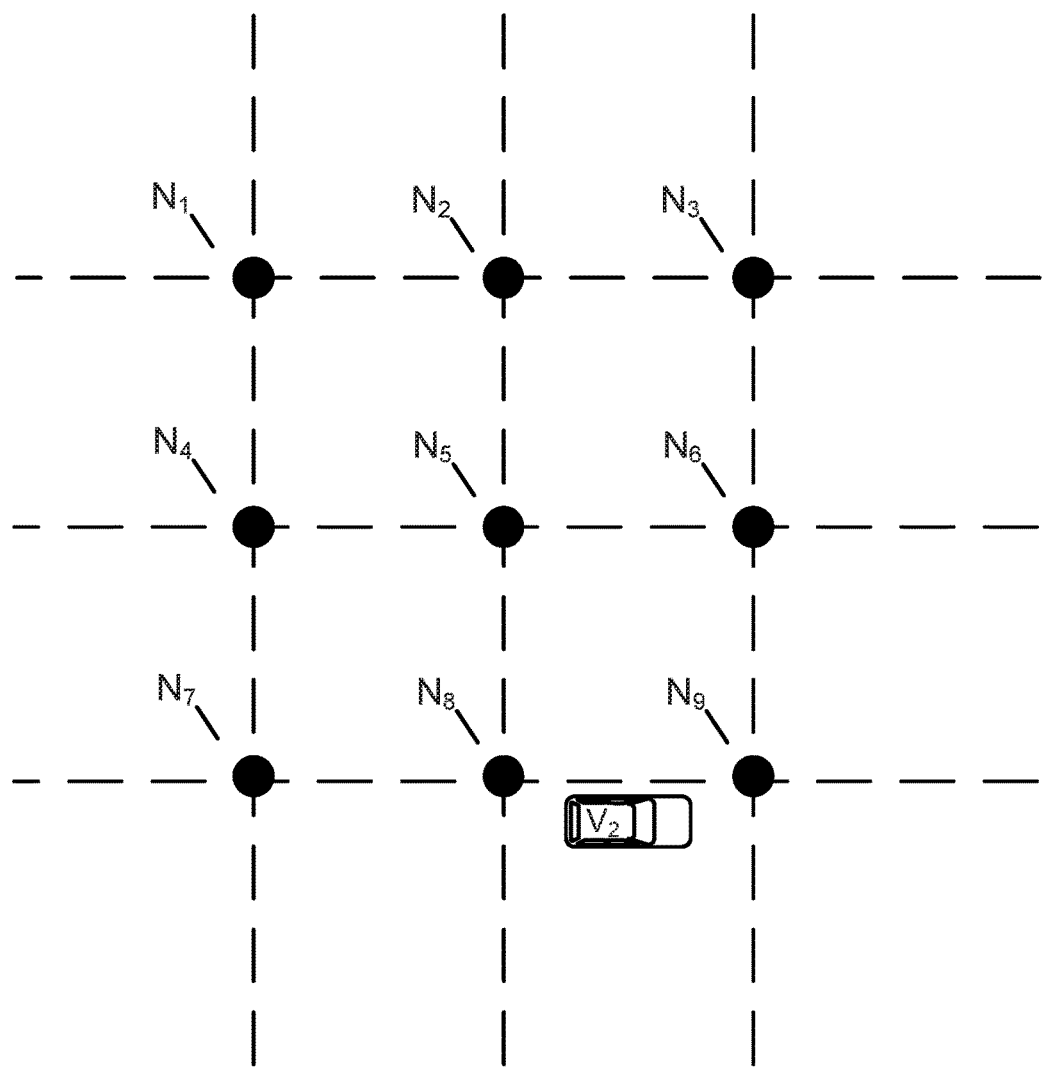

In FIG. 4H, Vehicle $V_2$ progresses from node $N_8$ to node $N_9$ reaching its destination. The corresponding vehicle location table, Table 13, indicates the location of vehicle $V_2$ at node $N_9$.

TABLE 13

Vehicle Locations: FIG. 4H

| $N_1$ | $N_2$ | $N_3$ |
|---|---|---|
| $N_4$ | $N_5$ | $N_6$ |
| $N_7$ | $N_8$ | $N_9$ |
|  |  | $V_2$ |

Table 14 includes values for the roadway graph corresponding to FIG. 4H, illustrating a decremented value of node $N_6$ to zero and an incremented value of node $N_9$ to one.

TABLE 14

Roadway Graph: FIG. 4H

| $N_1$ | $N_2$ | $N_3$ |
|---|---|---|
| {$N_2$: 0, $N_4$: 0} | {$N_1$: 0, $N_3$: 0, $N_5$: 0} | {$N_2$: 0, $N_6$: 0} |
| $N_4$ | $N_5$ | $N_6$ |
| {$N_1$: 0, $N_5$: 0, $N_7$: 0} | {$N_8$: 0, $N_2$: 0, $N_4$: 0, $N_6$: 0} | {$N_9$: 0, $N_3$: 0, $N_5$: 0} |
| $N_7$ | $N_8$ | $N_9$ |
| {$N_8$: 0, $N_4$: 0} | {$N_9$: 0, $N_5$: 0, $N_7$: 0} | {$N_8$: 1, $N_6$: 0} |

Figure 5:
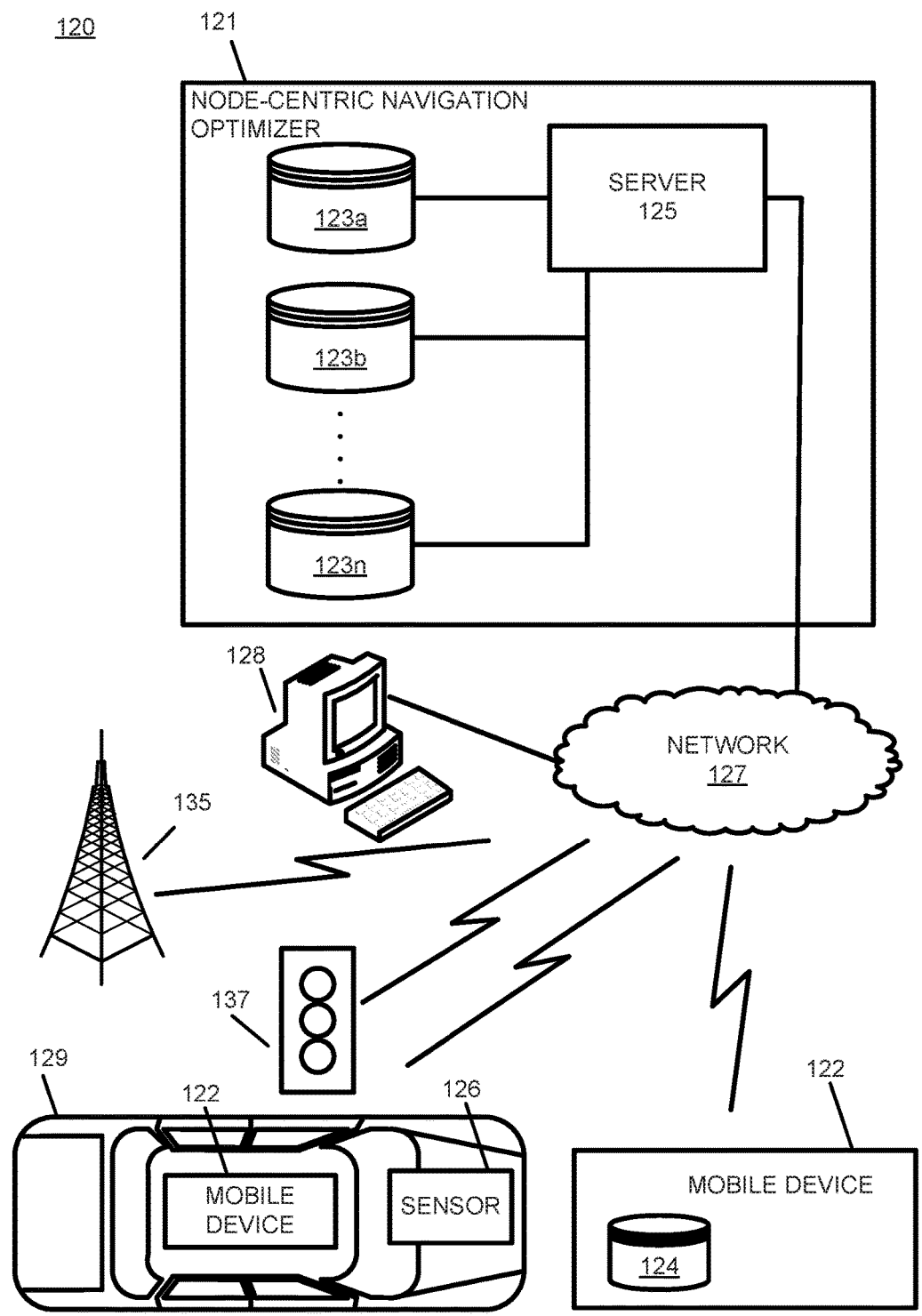
FIG. 5 illustrates an example system of the subject technology for node-centric navigation optimization.

FIG. 5 illustrates one example system 120 for node-centric navigation optimization. The system 120 includes node-centric navigation optimization system 121, one or more mobile devices 122 (navigation devices), a workstation 128, and a network 127. The system may further include networking device 135, traffic device 137, and/or a vehicle 129 including a mobile device 122 and a sensor 126. Additional, different, or fewer components may be provided. For example, many mobile devices 122, vehicles 129 and/or workstations 128 connect with the network 127. The node-centric navigation optimization system 121 includes a server 125 and one or more databases. The server 125 may maintain multiple databases 123a, 123b . . . 123n. One or more of these databases may include databases as illustrated in FIGS. 3A-3B. The term database and refers to a set of data stored in a storage medium and may not necessarily reflect specific any requirements as to the relational organization of the data. The term "server" is used herein to collectively include the computing devices at the node-centric navigation optimization system 121 for creating, maintaining, and updating the multiple databases 123a-123n. Any computing device may be substituted for the mobile device 122. The computing device may be a host for a website or web service such as a mapping service or a navigation service. A mapping service may provide maps generated from the databases 123a-123n using node-centric navigation optimization information, and the navigation service may calculate routing or other directions from the geographic data and node-centric navigation optimization information of the databases 123a-123n.

Mobile device 122, vehicle 129, and/or network device 135 may include processors and databases providing some or all of the services provided by node-centric navigation optimizer 121. Local node-centric navigation optimizer 121 of mobile device 122 may operate in tandem with node-centric navigation optimizer 121 via network 127. As described herein, processing of affected node determinations, roadway graph updating, navigation, route calculation, estimated travel times, estimated time of arrival is described with reference to node-centric navigation optimizer 121. Additionally, alternatively, or jointly, acts of the disclosed embodiments may be performed by node-centric navigation optimizers disposed in or integral with mobile device 122, network device 135, and/or vehicle 129.

Figure 7:
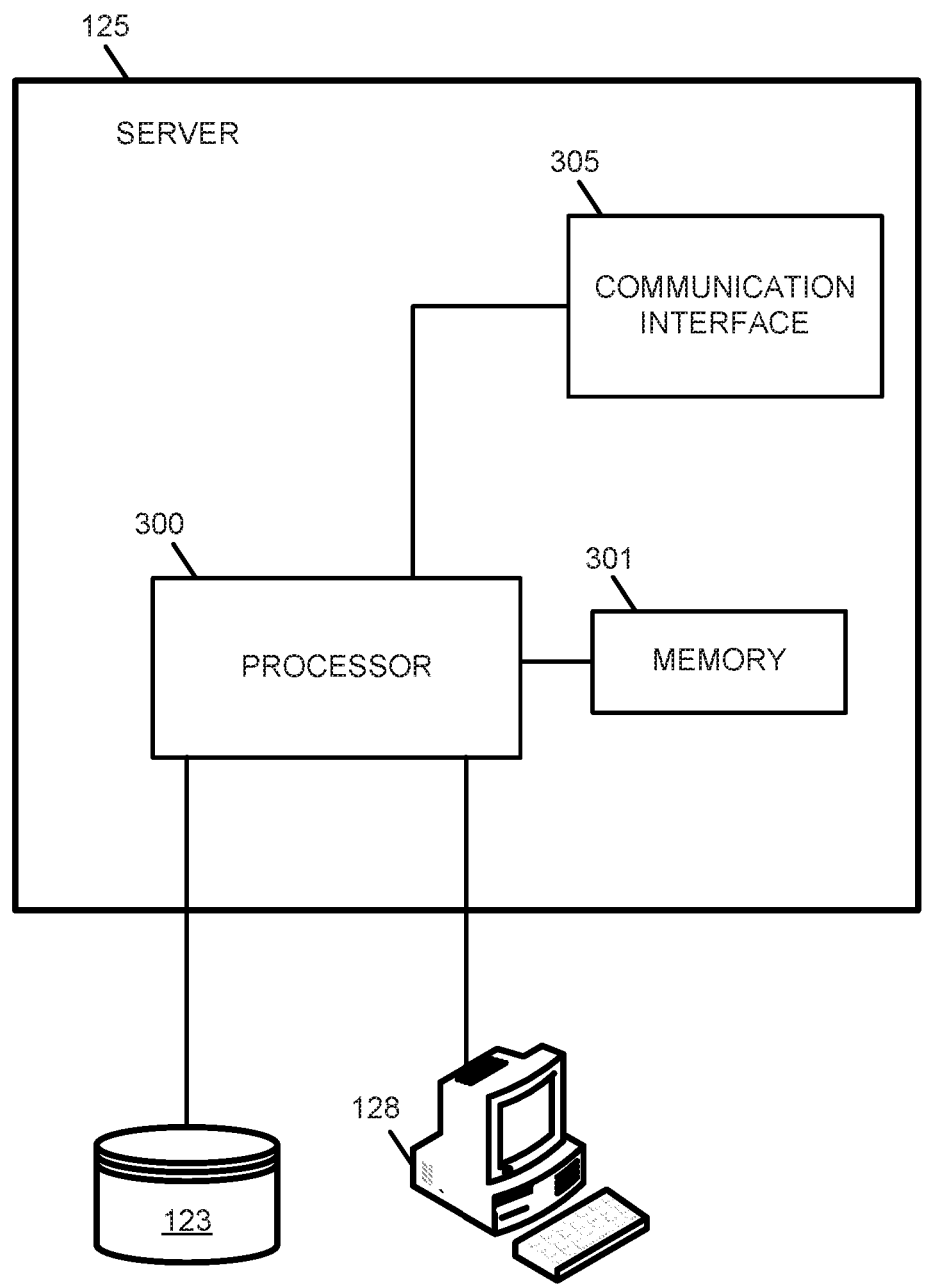
FIG. 7 illustrates an example server of the subject technology for node-centric navigation optimization.

The databases 123a-123n may include a roadway graph database that may include road element information, current weights of nodes, historic node weights, navigation information, traffic information, driver profile information, historical traffic information, road imagery including street level images, point cloud data, and/or existing map data. As shown in FIG. 7, a master copy of the database 123a may be stored at the node-centric navigation optimizer 121, and the databases 123b-n may include alternative versions or past versions of aggregated, generalized roadway graphs and/or optimization algorithms associated with navigation maps. The master copy of the database 123a may be the most current or up to date copy of the database. In addition, the mobile device 122 may store a local copy of the database 124. In one example, the local copy of the database 123b is a full copy of the database, and in another example, the local copy of the database 124 may be a cached or partial portion of the database.

The local copy of the database 124 located on mobile device 122 may include data from various versions of the database 123a-123n. The cached portion may be defined based on a geographic position, location, or direction of the mobile device 122 or a user selection made at the mobile device 122. The server 125 may send node-centric navigation optimization information to the mobile device 122.

The mobile device 122 may be a personal navigation device (PND), a portable navigation device smart phone, a mobile phone, a personal digital assistant (PDA), a car, a tablet computer, a notebook computer, and/or any other known or later developed connected device or personal computer. Non-limiting embodiments of navigation devices may also include relational database service devices, mobile phone devices, or car navigation devices. The vehicle 129 with mobile device 122 and sensor 126 may be an autonomous driving vehicle, a data acquisition vehicle, or a vehicle equipped with navigation or other communication capabilities.

The node-centric navigation optimizer 121, the workstation 128, the mobile device 122, and vehicle 129 are coupled with the network 127. The phrase "coupled with" is defined to mean directly connected to or indirectly connected through one or more intermediate components. Such intermediate components may include hardware and/or software-based components.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

Figure 6:
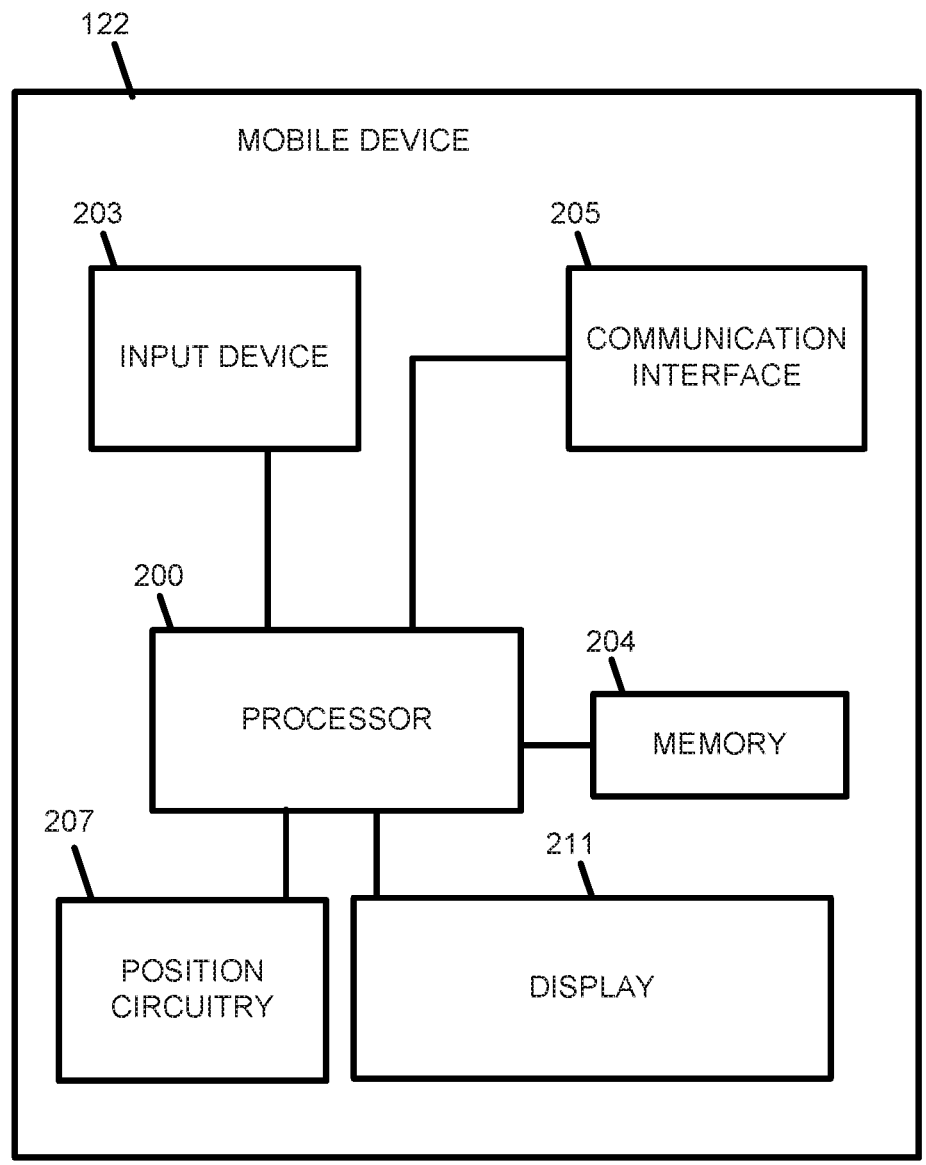
FIG. 6 illustrates an example mobile device of the subject technology for node-centric navigation optimization.

FIG. 6 illustrates an exemplary mobile device 122 of the system of FIG. 5. The mobile device 122 includes a processor 200, a memory 204, an input device 203, a communication interface 205, position circuitry 207, and a display 211. Additional, different, or fewer components are possible for the mobile device 122. FIGS. 1-2 illustrate example flow diagrams for the operation of mobile device 122 and processor 200. Additional, different, or fewer acts may be provided.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively, or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122.

The input device 203 may be one or more buttons, keypad, keyboard, mouse, stylist pen, trackball, rocker switch, touch pad, voice recognition circuit, or other device or component for inputting data to the mobile device 100. The input device 203 and the display 211 may be combined as a touch screen, which may be capacitive or resistive. The display 211 may be a liquid crystal display (LCD) panel, light emitting diode (LED) screen, thin film transistor screen, or another type of display.

The processor 200 and/or processor 300 may include a general processor, digital signal processor, an application specific integrated circuit (ASIC), field programmable gate array (FPGA), analog circuit, digital circuit, combinations thereof, or other now known or later developed processor. The processor 200 and/or processor 300 may be a single device or combinations of devices, such as associated with a network, distributed processing, or cloud computing. The processor 200 and/or processor 300 may include a node-centric navigation optimizer. Mobile device 122 may receive and store map information, road element information, and maneuver information along with made metadata associated with these types of information. Processor 200 may receive route information via network 127 and calculate a route from the starting point to the destination point. Processor 200 may perform all estimation of travel times and estimation of arrival times locally on mobile device 122. That is, mobile device 122 may receive map and/or navigation information via network 127 identifying road elements, maneuvers, links information, traffic information, and other information via network 127. Processor 200 of mobile device 122 may calculate initial route information based on destination information, the vehicle's current position data, receive roadway graph data, optimize the route of the vehicle on mobile device 122. Processor 200 of mobile device 122 may additionally receive information associated with vehicle 129 and its ground truth, i.e., actual travel time an actual route information associated with the trip. Processor 200 may then update and augment position and or route data based on the data collected during the trip. Processor 200 of mobile device 122 may work in tandem with server 125 via network 127 to perform some or all of, route determination, route optimization, vehicle position data, or roadway graph weight values. Alternatively, processor 200 may be used to transmit anonymized and/or non-geographically specific and/or generalized vehicle position information via network 127 for use in updating the roadway graph information of node-centric navigation optimizer 121. Anonymized or non-geographically specific information associated with the driver profile information may be sent to network sent over network 127 to node-centric navigation optimizer 121 such that roadway graph information may be updated from multiple drivers, regardless of whether all vehicles use route optimization features. Roadway graph information received by node-centric navigation optimizer 121 may be used in tandem with current traffic information stored in databases 123a-123n of navigation and/or node-centric navigation optimizer 121.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The mobile device 122 is configured to execute mapping algorithms to determine a route to travel along a road network from an origin location/starting point to a destination location/destination point in a geographic area that may use maps including large scale scan information. Mobile device 122 may be configured to acquire vehicle position data, directions of travel, imagery or other data. Using input from the end user, the navigation device 122 may examine potential routes between the origin location and the destination location to determine the optimum route prior to route optimization using node-centric navigation optimizer 121. The navigation device 122 may then provide the end user with information about the optimum route in the form of guidance that identifies the maneuvers required to be taken by the end user to travel from the origin to the destination location, travel information, and travel time information. Some navigation devices 122 show detailed maps on displays outlining the route, the types of maneuvers to be taken at various locations along the route, locations of certain types of features, and so on.

Using input from the driver or other passenger in the vehicle such as a starting point and/or a destination point, mobile device 122 may request and receive navigation information specifying road elements, maneuvers, and a route from the starting point to the destination point via network 127. Mobile device 122 may receive roadway graph information via network 127. Mobile device 122 additionally receive current traffic information from sources other than node-centric navigation optimizer 121 via network 127.

FIG. 7 illustrates an example server 125. The server 125 includes a processor 300, a communication interface 305, and a memory 301. The server 125 may be coupled to one or more databases 123 and a workstation 128. The workstation 128 may be used to enter data regarding geographic area maps, traffic cluster data, road element information, maneuver information, navigation information, traffic information, driver profile information, historical traffic information, road imagery including street level images, point cloud data, and/or existing map data. The databases 123 may include information entered from workstation 128. Additional, different, or fewer components may be provided in the server 125. FIGS. 1-2 illustrate example flow diagrams for the operation of server 125. Additional, different, or fewer acts may be provided.

The processor 300 and/or processor 200 may include a general processor, digital signal processor, ASIC, FPGA, analog circuit, digital circuit, combinations thereof, or other now known or later developed processor. The processor 300 and/or processor 200 may be a single device or combinations of devices, such as associated with a network, distributed processing, or cloud computing. The processor 300 and/or processor 200 perform operations associated with the node-centric navigation optimizer. Server 125 may receive and store map information, road element information, and maneuver information, aggregated driver information, driver profile information, personalization information, current traffic information, and metadata associated with these types of information. Processor 300 may receive starting point, intermediate travel points, and/or destination points from mobile device 122 via network 127 and determine vehicle position data, vehicle direction information, affected node information, roadway graph information, map information, road element information, maneuver information, aggregated driver information, driver profile information, personalization information, current traffic information, and metadata. Processor 300 may perform all updating of roadway graph information and may further optimize routes of one or more individual vehicles at server 125. Processor 300 may continually update and store roadway graph data based on the received vehicle position information and/or send updated roadway graph data to mobile device 122. Processor 200 of mobile device 122 may work in tandem with processor 300 and server 125 via network 127 to perform some or all of the functions of node-centric navigation optimizer 121.

The memory 301 and/or memory 204 may be a volatile memory or a non-volatile memory. The memory 301 and/or memory 204 may include one or more of a read only memory (ROM), random access memory (RAM), a flash memory, an electronic erasable program read only memory (EEPROM), or other type of memory.

The communication interface 305 and/or communication interface 205 may include any operable connection. An operable connection may be one in which signals, physical communications, and/or logical communications may be sent and/or received. An operable connection may include a physical interface, an electrical interface, and/or a data interface. The communication interface 305 and/or communication interface 205 provides for wireless and/or wired communications in any now known or later developed format.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes, acts, and logic flows described in this specification can be performed by one or more programmable processors executing one or more computer programs to perform functions by operating on input data and generating output. The processes, acts, and logic flows can also be performed by, and apparatus can also be implemented as, special purpose logic circuitry, e.g., an FPGA or an ASIC.

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or is operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a vehicle, a navigation device, a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the Figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method of node-centric navigation optimization, the method comprising:
   identifying a roadway graph representative of at least a portion of a roadway, the roadway graph comprising a plurality of nodes of the roadway and a weight for each of the plurality of nodes indicative of a number of vehicles of a fleet of vehicles corresponding to a node in a path of a vehicle of the fleet of vehicles;
   receiving vehicle position data from a sensor of the vehicle of the fleet of vehicles on the roadway;
   identifying an affected node of the roadway based on the vehicle position data;
   incrementing a weight of the affected node if the affected node is a node in a forward path of the vehicle;
   decrementing the weight of the affected node if the affected node is a node in a wake of the vehicle; and
   updating the roadway graph based on the weight of the affected node of the roadway, wherein a route of the vehicle is optimized based on the updated roadway graph.

2. The method of claim 1, wherein identifying the affected node of the roadway further comprises:
   determining whether the affected node is the node in the forward path of the vehicle or the node in the wake of the vehicle.

3. The method of claim 2, wherein determining whether the affected node is the node in the forward path of the vehicle or the node in the wake of the vehicle is based on a current position of the vehicle and a direction of travel.

4. The method of claim 3, wherein determining whether the affected node is the node in the forward path of the vehicle or the node in the wake of the vehicle is based on one or more previous positions of the vehicle.

5. The method of claim 1, further comprising:
   receiving infrastructure data associated with the roadway; and
   updating the roadway graph using the received vehicle position data and the received infrastructure data.

6. The method of claim 5, wherein the received infrastructure data includes traffic light duration data.

7. The method of claim 1, wherein the received vehicle position data includes vehicle identification information.

8. The method of claim 1, wherein optimizing the route of the vehicle further comprises:
   calculating a best route of the vehicle based on weights of nodes along possible routes to a destination of the vehicle.

9. The method of claim 1, further comprising:
   providing an indication of change in the route.

10. The method of claim 9, wherein providing an indication of change in the route further comprises:
    providing graphical navigation information for display by the vehicle.

11. The method of claim 9, wherein providing the indication of change in the route further comprises:
    providing instructions controlling autonomous operation of the vehicle; or
    providing a selection of possible navigation options for selection by a passenger of the vehicle, wherein the vehicle is capable of semi-autonomous operation.

12. An apparatus for node-centric navigation optimization comprising:
    at least one processor; and
    at least one memory including computer program code for one or more programs; the at least one memory and the computer program code configured to, with the at least one processor, cause the apparatus to at least:
    identify a roadway graph representative of at least a portion of a roadway, the roadway graph comprising a plurality of nodes of the roadway and a weight for each of the plurality of nodes indicative of a number of vehicles of a fleet of vehicles corresponding to a node in a path of a vehicle of the fleet of vehicles;
    receive vehicle position data associated with the vehicle of the fleet of vehicles on the roadway;
    identify an affected node of the roadway based on the vehicle position data;
    increment a weight of the affected node if the affected node is a node in a forward path of the vehicle;
    decrement the weight of the affected node if the affected node is a node in a wake of the vehicle; and
    update the roadway graph representative based on the weight of the affected node of the roadway, wherein a route of the vehicle is optimized based on the updated roadway graph.

13. The apparatus of claim 12, wherein identification of the affected node of the roadway further causes the apparatus to:
    determine whether the affected node is the node in a forward path of the vehicle or the node in the wake of the path of the vehicle.

14. An apparatus comprising:
    at least one processor; and
    at least one memory including computer program code for one or more programs; the at least one memory and the computer program code configured to, with the at least one processor, cause the apparatus to at least:
    receive vehicle position data for a vehicle;
    identify an affected node of the roadway based on the vehicle position data;
    increment a weight of the affected node if the affected node is a node in a forward path of the vehicle;
    decrement the weight of the affected node if the affected node is a node in a wake of the vehicle;
    update a roadway graph representative of at least a portion of the roadway based on the weight of the affected node of the roadway; and
    provide at least a portion of the updated roadway graph to the vehicle on the roadway for optimization of a route of the vehicle.

15. A method of node-centric navigation optimization, the method comprising:
    receiving vehicle position data based on a plurality of sensors of a fleet of associated vehicles on roadways of a geographic area;
    identifying a roadway graph representative of at least a portion of the roadways, the roadway graph comprising a plurality of nodes of the roadways and a weight for each of the plurality of nodes indicative of a number of vehicles of the fleet of associated vehicles at a node in a path of a vehicle of the fleet of associated vehicles;
    identifying one or more affected nodes of roadways based on vehicle position data of the fleet of associated vehicles;
    updating the roadway graph based on the one or more affected nodes of the roadways; and optimizing routes of the fleet of associated vehicles based the updated roadway graph.

16. The method of claim 15, wherein identifying the one or more affected nodes of the roadways further comprises:
determining whether each respective affected node is in a forward path of any vehicle of the fleet of associated vehicles or in a wake of a path of any vehicle of the fleet of associated vehicles.

17. The method of claim 15, wherein updating the roadway graph using the received vehicle position data further comprises:
incrementing a weight of each respective affected node in a forward path of any vehicle of the fleet of associated vehicles; and
decrementing the weight of each respective affected node in the wake of the path of any vehicle of the fleet of associated vehicles.

\* \* \* \* \*